United States Patent
Ooba

(10) Patent No.: US 10,148,852 B2
(45) Date of Patent: Dec. 4, 2018

(54) IMAGE PROCESSING SYSTEM, CONTROL APPARATUS, IMAGE PROCESSING APPARATUS, AND METHODS OF CONTROLLING THESE

(71) Applicant: CANON KABUSHIKI KAISHA, Tokyo (JP)

(72) Inventor: Hideaki Ooba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/618,628

(22) Filed: Jun. 9, 2017

(65) Prior Publication Data
US 2017/0366701 A1 Dec. 21, 2017

(30) Foreign Application Priority Data
Jun. 20, 2016 (JP) ................................ 2016-122051

(51) Int. Cl.
*H04N 1/327* (2006.01)
*H04N 1/00* (2006.01)

(52) U.S. Cl.
CPC ....... *H04N 1/32747* (2013.01); *H04N 1/0001* (2013.01); *H04N 1/00037* (2013.01); *H04N 1/00076* (2013.01); *H04N 1/00344* (2013.01); *H04N 1/00973* (2013.01); *H04N 2201/0017* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,389,816 B2 | 7/2016 | Nishiyama | |
| 2010/0025926 A1* | 2/2010 | Shimizu | G03G 15/5012 271/225 |
| 2015/0049363 A1* | 2/2015 | Nishiyama | G06F 3/1236 358/1.15 |
| 2016/0219054 A1* | 7/2016 | Nagata | G06F 3/14 |

FOREIGN PATENT DOCUMENTS

JP 2015037259 A 2/2015

* cited by examiner

*Primary Examiner* — Frantz Bataille
(74) *Attorney, Agent, or Firm* — Fitzpatrick, Cella, Harper & Scinto

(57) ABSTRACT

An image processing system includes a control apparatus and an image processing apparatus to which the control apparatus is connected and that accesses a network via the control apparatus, wherein remote maintenance by an information processing apparatus is performed via the network. The image processing apparatus connects to a server apparatus that relays communication between the control apparatus and the information processing apparatus. The control apparatus notifies the image processing apparatus that it will restart in accordance with a restart instruction from the information processing apparatus which is connected to the control apparatus via the server apparatus and which maintains the control apparatus remotely, the restart being instructed by the information processing apparatus to the control apparatus while the remote maintenance of the control apparatus is continuing, and instructs the image processing apparatus to reconnect to the server apparatus, in accordance with completion of the restart of the control apparatus.

15 Claims, 17 Drawing Sheets

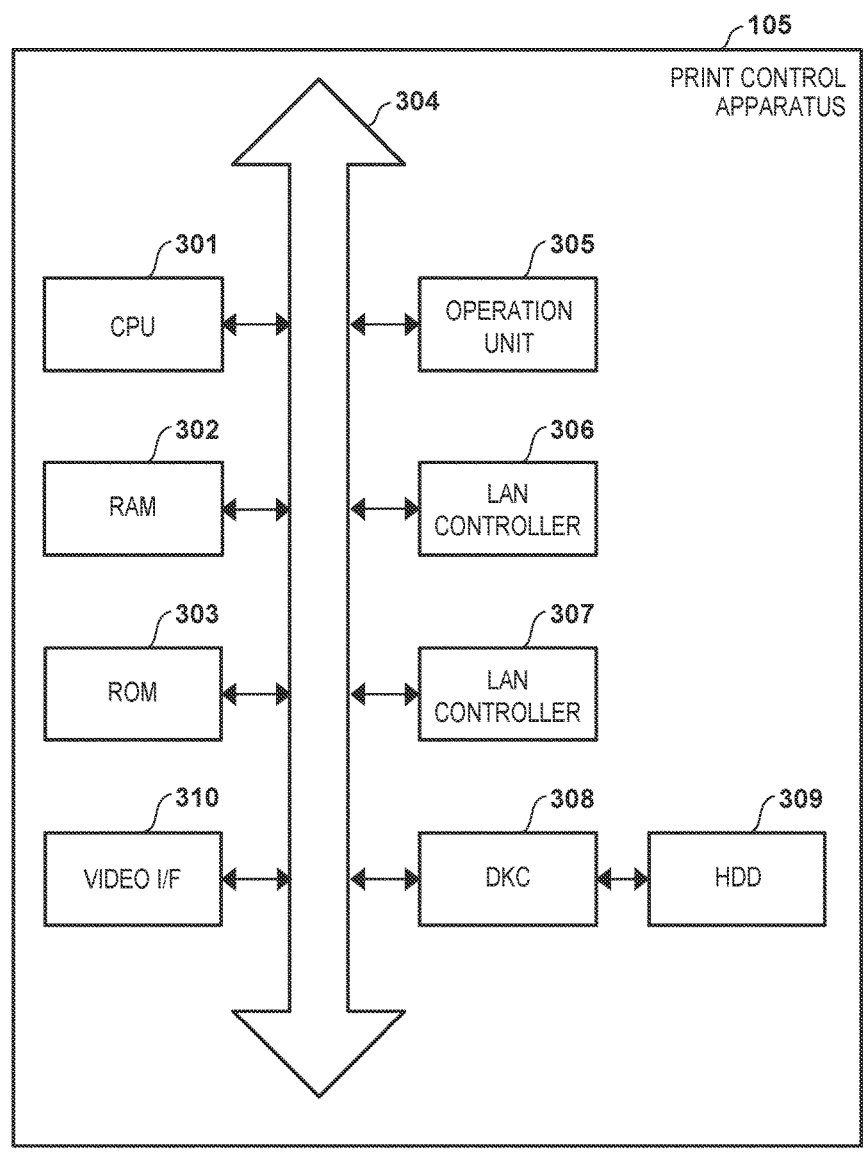
F I G. 3A

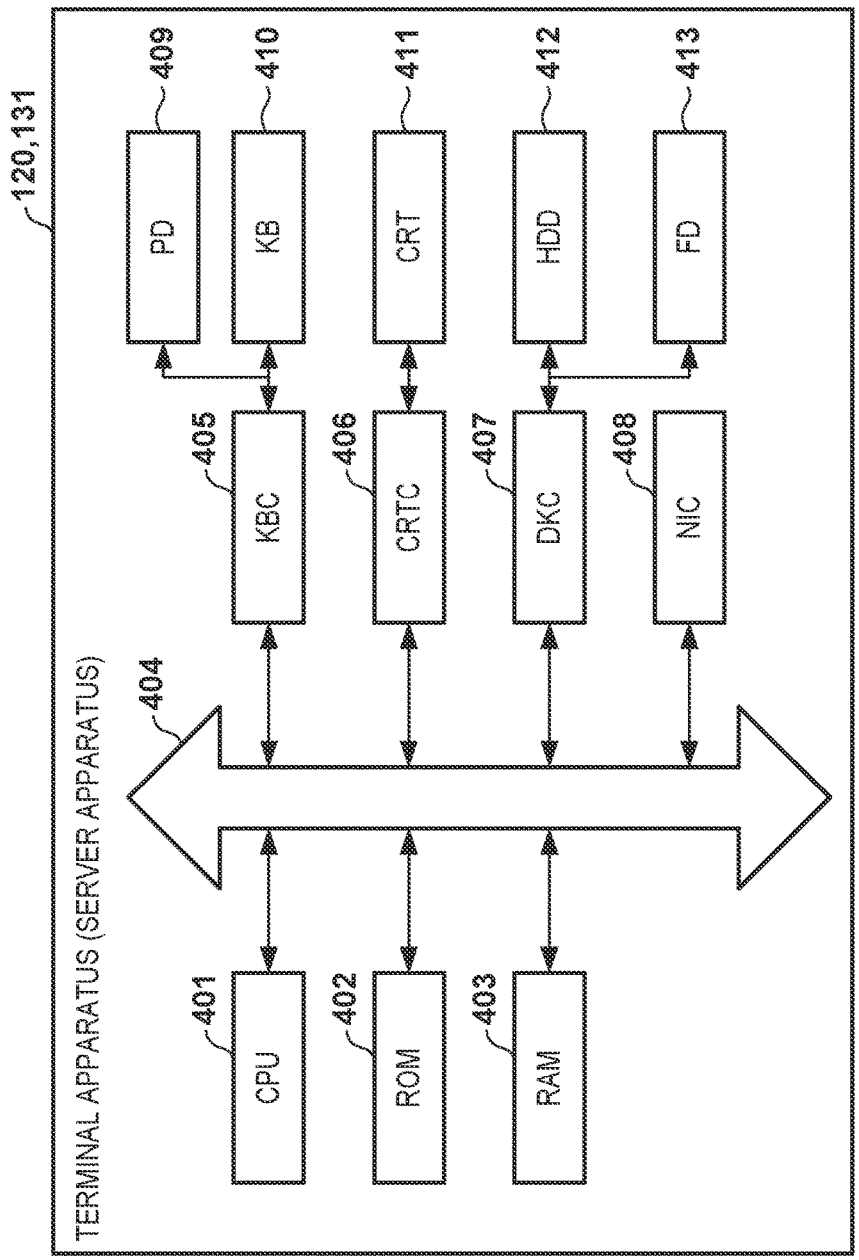

FIG. 5A

| 801 | 802 | 803 | 804 |
|---|---|---|---|
| SERIAL NO | MODEL NAME | CUSTOMER NAME | SERVICE PERSON NAME |
| SN0001 | MFP1 | COMPANY A | serv1 |
| SN0002 | MFP1 | COMPANY B | serv2 |
| SN0003 | MFP2 | COMPANY C | serv2 |
| SN0004 | MFP3 | COMPANY A | serv1 |

| 811 | 812 | 813 | 814 | 815 | 816 | 817 |
|---|---|---|---|---|---|---|
| SERIAL NO | MODEL NAME | CUSTOMER NAME | IMAGE FORMING APPARATUS CONNECTION TIME | SERVICE PERSON CONNECTION TIME | CORRESPONDING SERVICE PERSON NAME | CONNECTION ID |
| SN0001 | MFP1 | COMPANY A | 2012/10/31 13:00 | 2012/10/31 13:01 | serv1 | 1234 |
| SN0002 | MFP1 | COMPANY B | 2012/10/31 13:05 | — | — | 5678 |
| SN0004 | MFP3+DFE | COMPANY A | 2012/10/31 13:10 | — | — | 9012 |

810

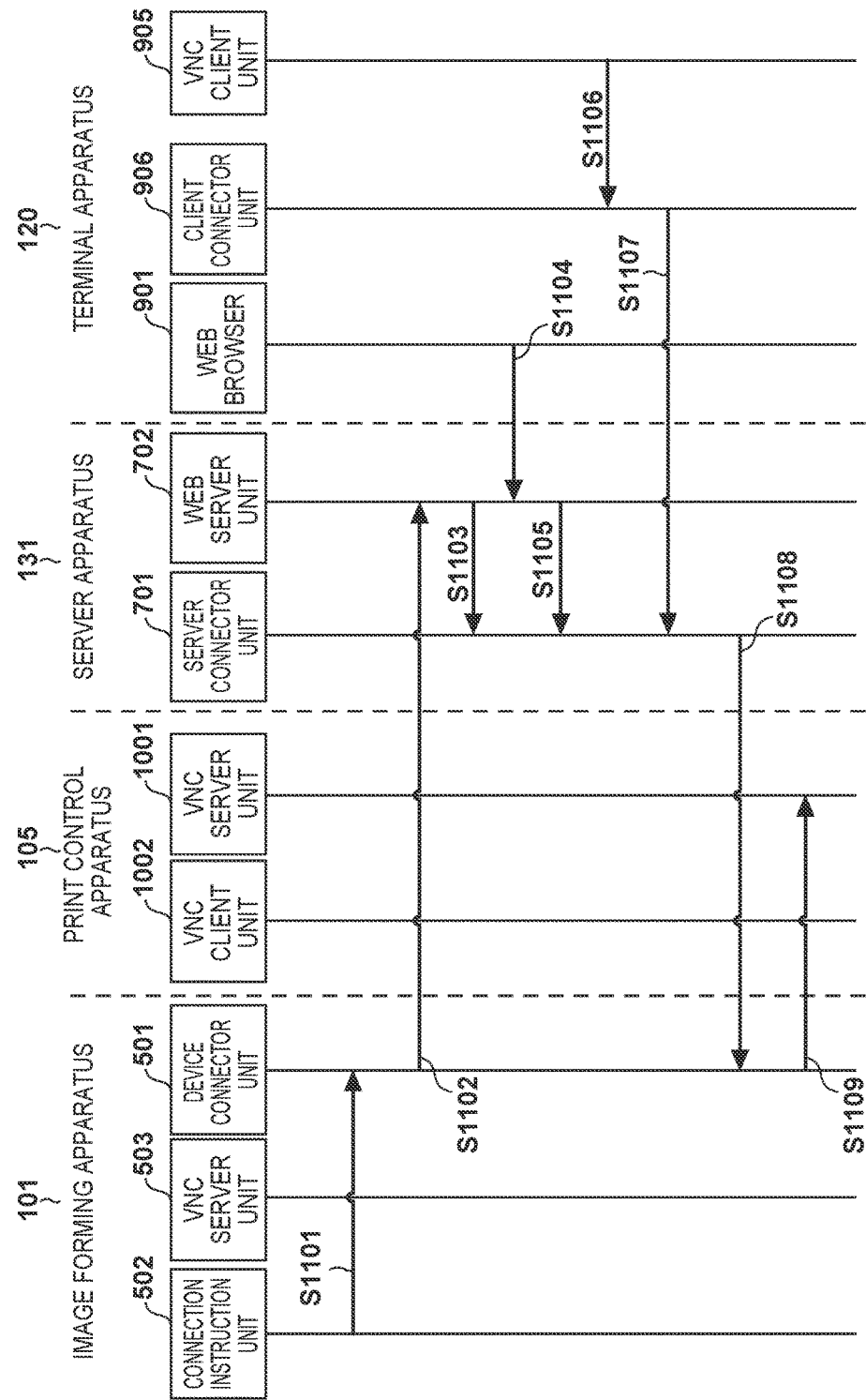

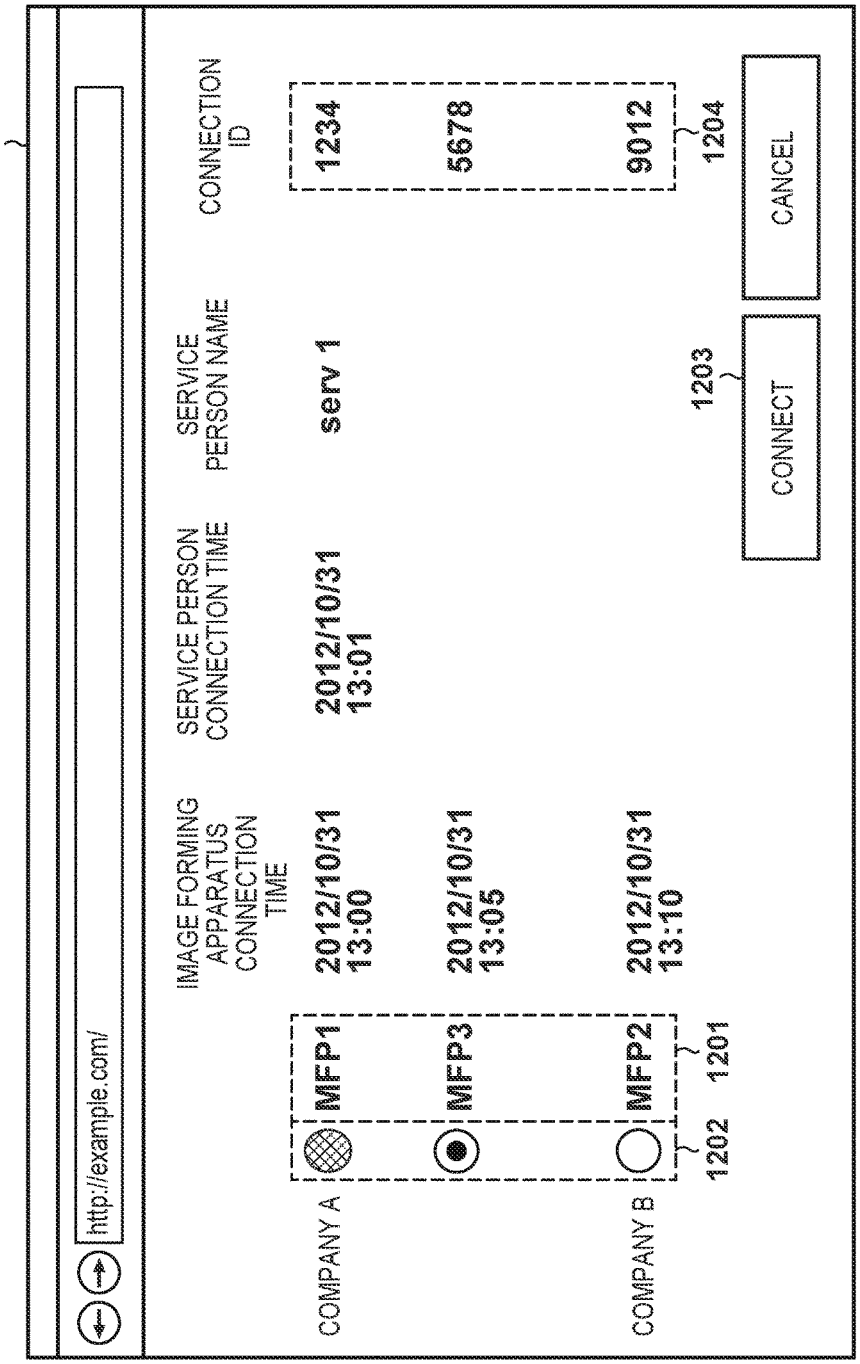

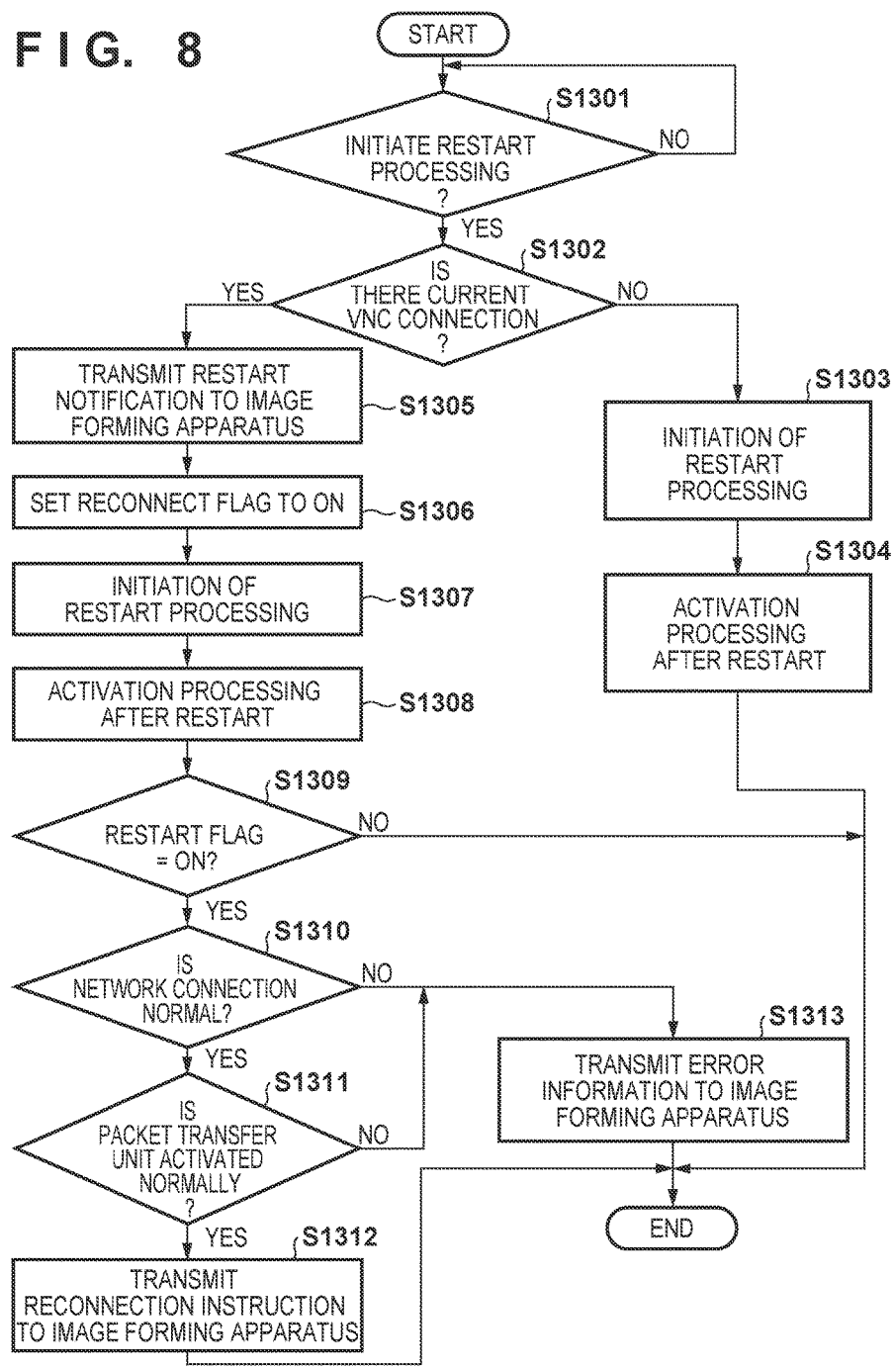

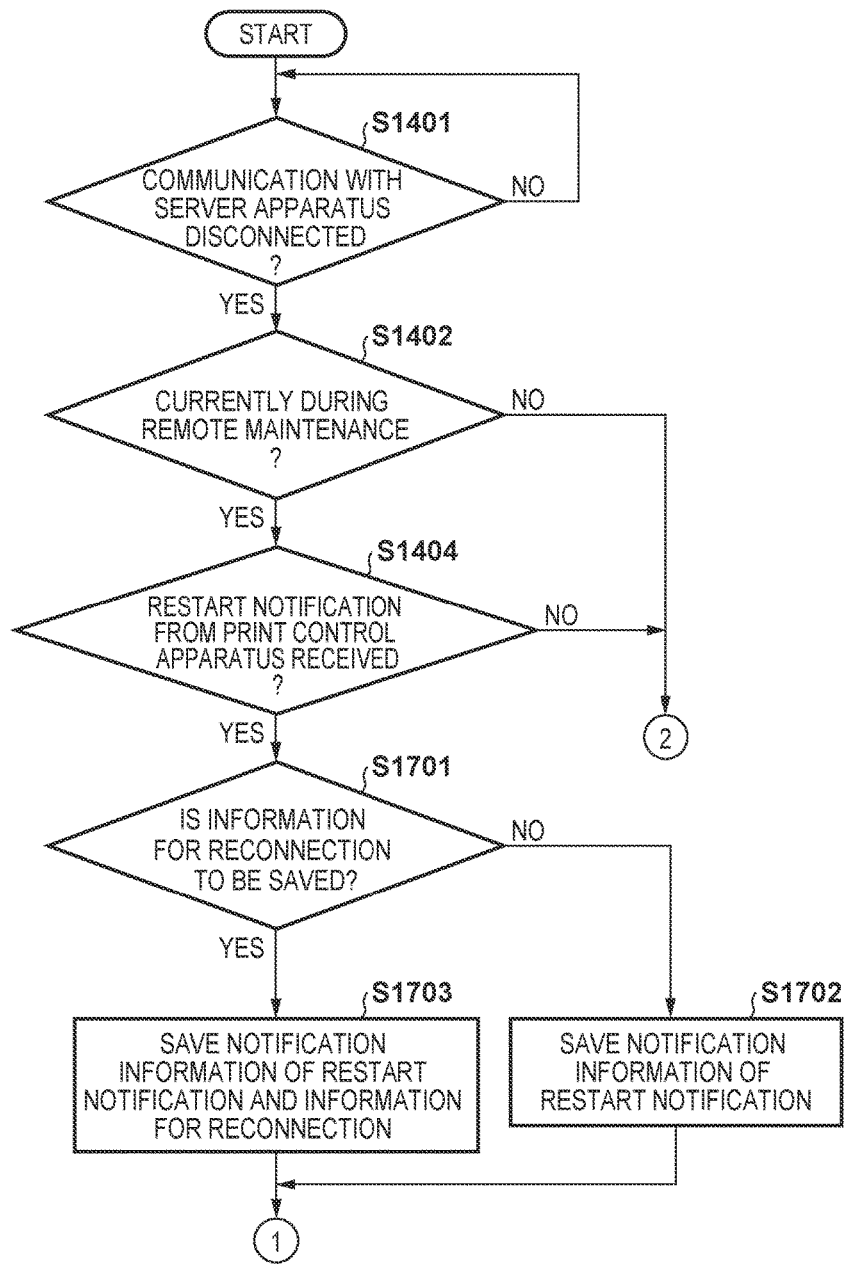

IMAGE PROCESSING SYSTEM, CONTROL APPARATUS, IMAGE PROCESSING APPARATUS, AND METHODS OF CONTROLLING THESE

BACKGROUND OF THE INVENTION

Field of the Invention

The present invention relates to an image processing system, a control apparatus, an image processing apparatus, and methods of controlling these.

Description of the Related Art

In recent years, a remote maintenance service by voice, moving image communication, and remote operation in image processing apparatuses such as multifunction peripherals (MFP) has been proposed. In a remote maintenance service, when an error occurs in the image processing apparatus, it becomes possible to solve the error by an operator of a call-center directly conveying an error solving approach to a user by voice and moving image communication or by the operator of the call-center performing a remote operation of the image processing apparatus. By this, it is possible to shorten the time necessary for solving an error without it being necessary for a worker to go to a site for maintenance.

A remote maintenance system for providing a remote maintenance service as described above generally can be realized by using a VNC (Virtual Network Computing) server function which is one of server functions supported by image processing apparatuses. Specifically, by a terminal apparatus (information terminal) such as a PC of a call-center making a connection (a VNC connection) to a VNC server operating on an image processing apparatus of a customer, an operation screen of the image processing apparatus can be displayed on the terminal apparatus. The operator of the call-center is able to perform remote maintenance of the image processing apparatus by directly operating the operation screen of the image processing apparatus on the terminal apparatus to perform a remote operation of the image processing apparatus.

There are cases when the image processing apparatus is caused to restart by an instruction or remote operation from the call-center in the remote maintenance service. For example, a restart of the image processing apparatus is performed in a case where a change of a setting that becomes active after the restart is performed or in a case where a glitch occurs in the apparatus. At a time of a restart of the image processing apparatus, a session between the image processing apparatus and the terminal apparatus is disconnected. After a restart of the image processing apparatus, a reconnection between the image processing apparatus and the terminal apparatus becomes necessary in order to continue the remote maintenance for a confirmation of a post-change setting and the like. In Japanese Patent Laid-Open No. 2015-037259, a technique in which, at a time of a restart of the image processing apparatus, a reconnection with a terminal apparatus is automatically performed based on information recorded prior to the restart is proposed.

Here, the image processing apparatus, which receives provision of the remote maintenance service, may be directly connected to a print control apparatus by a network cable, a dedicated cable or the like, and access to a network such as LAN may be possible only via the print control apparatus. In such a case, when a packet is received from the network side, the print control apparatus transfers the packet to the image processing apparatus by a packet transfer function such as NAT (Network Address Translation) or NAPT (Network Address Port Translation). Note that the print control apparatus is an apparatus for performing image processing by cooperating with the image processing apparatus.

In such a configuration, remote maintenance of both of the print control apparatus and the image processing apparatus becomes possible by the following processing, for example. In a case where a connection request to a VNC server of the image processing apparatus is received from the terminal apparatus of the network side, the print control apparatus transfers the connection request to the image processing apparatus. When the image processing apparatus, having received the connection request, transfers the connection request to (the VNC server of) the print control apparatus, remote maintenance of the print control apparatus from the terminal apparatus via the image processing apparatus becomes possible. Additionally, remote maintenance of the image processing apparatus from the terminal apparatus becomes possible by the print control apparatus transmitting a connection request, which is different from the received connection request, to the image processing apparatus to establish a VNC connection with the image processing apparatus.

In a configuration in which a print control apparatus is connected to the image processing apparatus as described above, the VNC connection between the terminal apparatus of the call-center and the image processing apparatus is disconnected when a restart of the print control apparatus is performed while remote maintenance of the print control apparatus is being performed. This is because packet transfer by the print control apparatus between the terminal apparatus and the image processing apparatus ceases to be performed due to the restart of the print control apparatus. In such a case, it is necessary that the image processing apparatus reconnects to the terminal apparatus after the restart of the print control apparatus. However, if an activation state of the print control apparatus is not known, the user of the image processing apparatus cannot know when to perform the operation for instructing the reconnection to the terminal apparatus, and because of this, a wasted waiting time can occur. Also, a wasted waiting time similarly can occur for the operator of the call-center.

SUMMARY OF THE INVENTION

The present invention was conceived in view of the above described issues. The present invention provides a technique for, while remote maintenance of a print control apparatus connected to an image processing apparatus is being performed, in a case where the print control apparatus restarts, enabling an activation state of the print control apparatus to be known in the image processing apparatus.

According to one aspect of the present invention, there is provided an image processing system comprising a control apparatus and an image processing apparatus to which the control apparatus is connected and that accesses a network via the control apparatus, wherein remote maintenance by an information processing apparatus is performed via the network, the image processing apparatus comprising: a connection unit configured to connect to a server apparatus that relays communication between the control apparatus and the information processing apparatus and establish communication with the information processing apparatus via the server apparatus and communication with the control apparatus, so as to enable the remote maintenance of the control apparatus and the image processing apparatus to be performed by the information processing apparatus, and the control apparatus comprising: a notification unit configured to notify the image processing apparatus that the control apparatus will restart, in accordance with a restart instruction from the information processing apparatus while the remote maintenance is continuing; and an instruction unit configured to instruct the image processing apparatus to reconnect to the server apparatus, in accordance with completion of the restart of the control apparatus.

According to another aspect of the present invention, there is provided a control apparatus in an image processing system comprising the control apparatus and an image processing apparatus to which the control apparatus is connected and that accesses a network via the control apparatus, wherein remote maintenance by an information processing apparatus is performed via the network, the control apparatus comprising: a notification unit configured to, after the image processing apparatus connects to a server apparatus that relays communication between the control apparatus and the information processing apparatus and establishes communication with the information processing apparatus via the server apparatus and communication with the control apparatus, notify the image processing apparatus that the control apparatus will restart in accordance with a restart instruction from the information processing apparatus while the remote maintenance is continuing; and an instruction unit configured to instruct the image processing apparatus to reconnect to the server apparatus, in accordance with completion of the restart of the control apparatus.

According to still another aspect of the present invention, there is provided an image processing apparatus in an image processing system comprising a control apparatus and the image processing apparatus to which the control apparatus is connected and that accesses a network via the control apparatus, wherein remote maintenance by an information processing apparatus is performed via the network, the image processing apparatus comprising: a connection unit configured to connect to a server apparatus that relays communication between the control apparatus and the information processing apparatus and establish communication with the information processing apparatus via the server apparatus and communication with the control apparatus, so as to enable the remote maintenance of the control apparatus and the image processing apparatus to be performed by the information processing apparatus; a display unit configured to display a screen indicating that the control apparatus is restarting in accordance with a notification that the control apparatus will restart, the notification being received from the control apparatus which was instructed to restart by the information processing apparatus while the remote maintenance is continuing; and a reconnection unit configured to reconnect to the server apparatus via the control apparatus in accordance with an instruction for reconnection to the server apparatus, the instruction being received from the control apparatus after completion of restart of the control apparatus.

According to yet another aspect of the present invention, there is provided a method of controlling an image processing system comprising a control apparatus and an image processing apparatus to which the control apparatus is connected and that accesses a network via the control apparatus, wherein remote maintenance by an information processing apparatus is performed via the network, the method comprising: the image processing apparatus connecting to a server apparatus that relays communication between the control apparatus and the information processing apparatus, and establishing communication with the information processing apparatus via the server apparatus and communication with the control apparatus, so as to enable the remote maintenance of the control apparatus and the image processing apparatus to be performed by the information processing apparatus; the control apparatus notifying the image processing apparatus that the control apparatus will restart, in accordance with a restart instruction from the information processing apparatus while the remote maintenance is continuing; and the control apparatus instructs the image processing apparatus to reconnect to the server apparatus, in accordance with completion of the restart of the control apparatus.

According to still yet another aspect of the present invention, there is provided a method of controlling a control apparatus in an image processing system comprising the control apparatus and an image processing apparatus to which the control apparatus is connected and that accesses a network via the control apparatus, wherein remote maintenance by an information processing apparatus is performed via the network, the method comprising: after the image processing apparatus connects to a server apparatus that relays communication between the control apparatus and the information processing apparatus and establishes communication with the information processing apparatus via the server apparatus and communication with the control apparatus, notifying the image processing apparatus that the control apparatus will restart in accordance with a restart instruction from the information processing apparatus while the remote maintenance is continuing; and instructing the image processing apparatus to reconnect to the server apparatus, in accordance with completion of the restart of the control apparatus.

According to yet still another aspect of the present invention, there is provided a method of controlling an image processing apparatus in an image processing system comprising a control apparatus and the image processing apparatus to which the control apparatus is connected and that accesses a network via the control apparatus, wherein remote maintenance by an information processing apparatus is performed via the network, the method comprising: connecting to a server apparatus that relays communication between the control apparatus and the information processing apparatus and establishing communication with the information processing apparatus via the server apparatus and communication with the control apparatus, so as to enable the remote maintenance of the control apparatus and the image processing apparatus to be performed by the information processing apparatus; displaying a screen indicating that the control apparatus is restarting in accordance with a notification that the control apparatus will restart, the notification being received from the control apparatus which was instructed to restart by the information processing apparatus while the remote maintenance is continuing; and reconnecting to the server apparatus via the control apparatus in accordance with an instruction for reconnection to the server apparatus, the instruction being received from the control apparatus after completion of restart of the control apparatus.

By virtue of the present invention, while remote maintenance of a print control apparatus connected to an image processing apparatus is being performed, in a case where the print control apparatus restarts, an activation state of the print control apparatus is enabled to be known in the image processing apparatus. Also, the image processing apparatus becomes able to automatically reconnect to a network in accordance with the activation state of the print control apparatus.

Further features of the present invention will become apparent from the following description of exemplary embodiments (with reference to the attached drawings).

BRIEF DESCRIPTION OF THE DRAWINGS

FIG. 3A is a block diagram illustrating an example of a hardware configuration of a print control apparatus 105.

FIG. 3B is a block diagram illustrating an example of a hardware configuration of a terminal apparatus 120 and a server apparatus 131.

FIGS. 5A and 5B illustrate an example of information stored in a DB unit 703.

FIG. 6 is a sequence diagram illustrating a procedure for establishing a connection between the terminal apparatus 120 and the print control apparatus 105.

FIG. 7 illustrates an example of a Web browser screen displayed on the terminal apparatus 120.

FIG. 8 is a flowchart illustrating a procedure of processing by the print control apparatus 105 according to a first embodiment.

FIGS. 10A and 10B are flowcharts illustrating a procedure of processing by the image forming apparatus 101 according to a second embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Configuration of a Remote Maintenance System>

Figure 1:
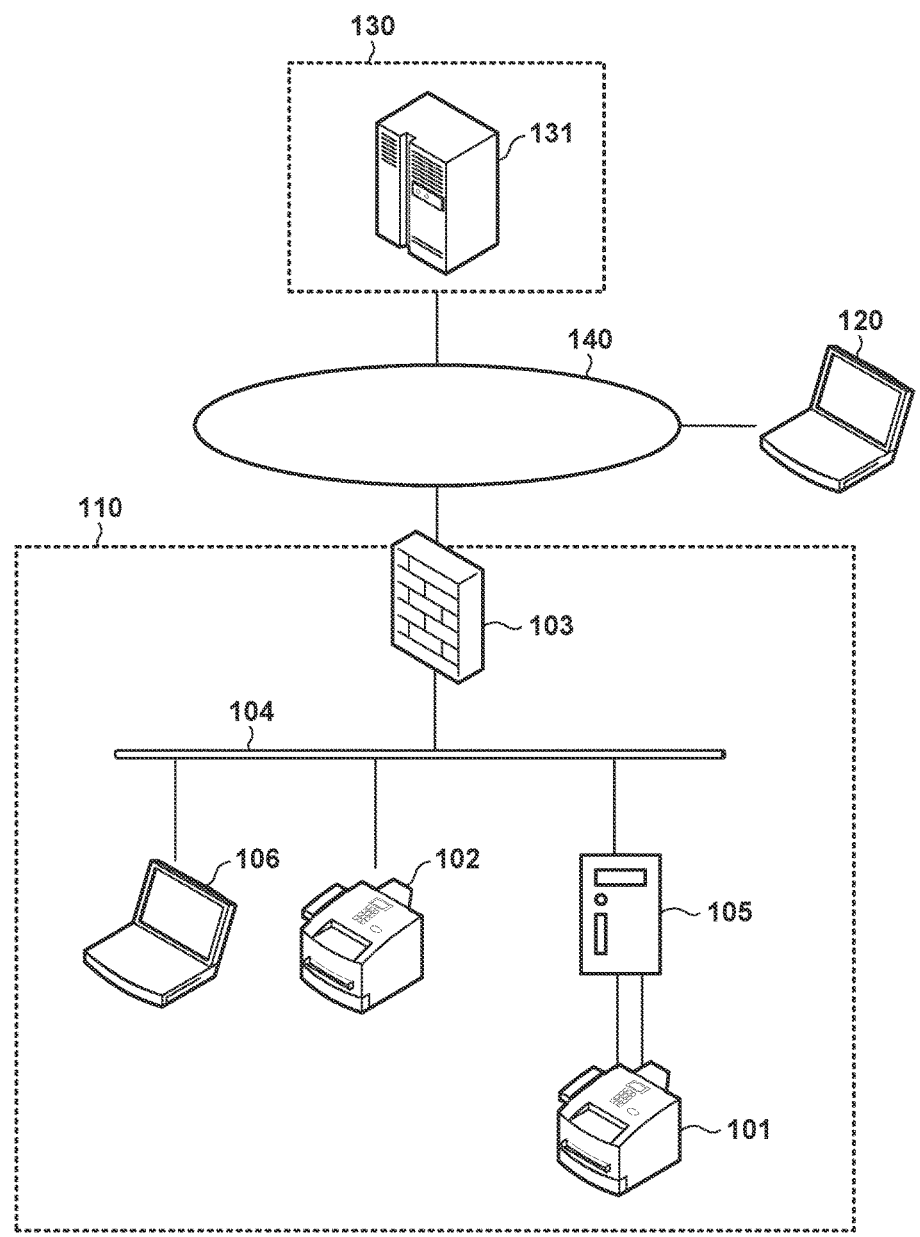
FIG. 1 is a block diagram illustrating an example of a configuration of a remote maintenance system.

FIG. 1 is a block diagram illustrating an example of a configuration of a remote maintenance system according to an embodiment. Image forming apparatuses 101 and 102, a print control apparatus 105, and a terminal apparatus (information terminal) 106 are arranged within a user environment 110 and are able to access the Internet 140 via a network (LAN) 104 in the system illustrated in FIG. 1. The print control apparatus 105 in which a network address/port conversion function (packet transfer function) such as NAT or NAPT is integrated is connected to the image forming apparatus 101. Accordingly, the image forming apparatus 101 accesses the Internet 140 via the print control apparatus 105. Note that a plurality of user environments 110 may exist and many image forming apparatuses and print control apparatuses may exist within the user environments 110.

The print control apparatus 105 relays communication to the Internet 140 that the image forming apparatus 101 transmits and, in a case where it receives a response from the Internet 140, relays this response to the image forming apparatus 101. The terminal apparatus 106 transmits data to the print control apparatus 105 in a case where the terminal apparatus 106 uses a function that the image forming apparatus 101 provides (such as a Web service for example). The print control apparatus 105, in a case where it receives data from the terminal apparatus 106, relays this data to the image forming apparatus 101. In a case where the image forming apparatus 101 transmits response data in relation to this data, the print control apparatus 105 relays this response data to the terminal apparatus 106. In this way, it is possible to access the Internet 140 via the network 104 even in the image forming apparatus 101 to which the print control apparatus 105 is connected. Also, it is possible to use a function of the image forming apparatus 101 from the terminal apparatus 106 within the user environment 110.

A firewall 103 is installed between the user environment 110 and the Internet 140. The firewall 103 is configured so as to permit a connection to the Internet 140 from a terminal within the user environment 110, and to reject a connection to a terminal within the user environment 110 from the Internet 140.

A terminal apparatus 120 (information processing apparatus) is a smart phone, a portable phone, a tablet, or a notebook type or desktop type PC for example, and can access the Internet 140. The terminal apparatus 120 is located in a call-center and is used by an operator of the call-center for remote maintenance of the image forming apparatus in the present embodiment.

A server apparatus group 130 is a server apparatus group comprising one or more server apparatuses (server computers) that provide services via the Internet 140. Although FIG. 1 illustrates an example in which the server apparatus group 130 is configured by one server apparatus 131, the server apparatus group 130 may be configured by a plurality of server apparatuses. A connection between the terminal apparatus 120 and the image forming apparatuses 101 and 102 can be established and a remote operation of the image forming apparatuses 101 and 102 can be performed from the terminal apparatus 120 in the remote maintenance system illustrated in FIG. 1 as described later. The terminal apparatus 120 communicates with the image forming apparatuses 101 and 102 via the server apparatus 131 in the present embodiment. The terminal apparatus 120 and the image forming apparatuses 101 and 102 each establishes a connection with the server apparatus 131 as an HTTP client as described later. By this, it becomes possible to perform communication by establishing a session with an apparatus connected to the server apparatus 131.

The image forming apparatus 101 is connected to the print control apparatus 105 (control apparatus) and is one example of an image processing apparatus that can access a network via the print control apparatus 105 in the present embodiment. Also, the print control apparatus 105 and the image forming apparatus 101 are one example of an image processing system in which remote maintenance by the terminal apparatus 120 is performed via a network.

<Hardware Configuration of the Image Forming Apparatus 101>

Figure 2:
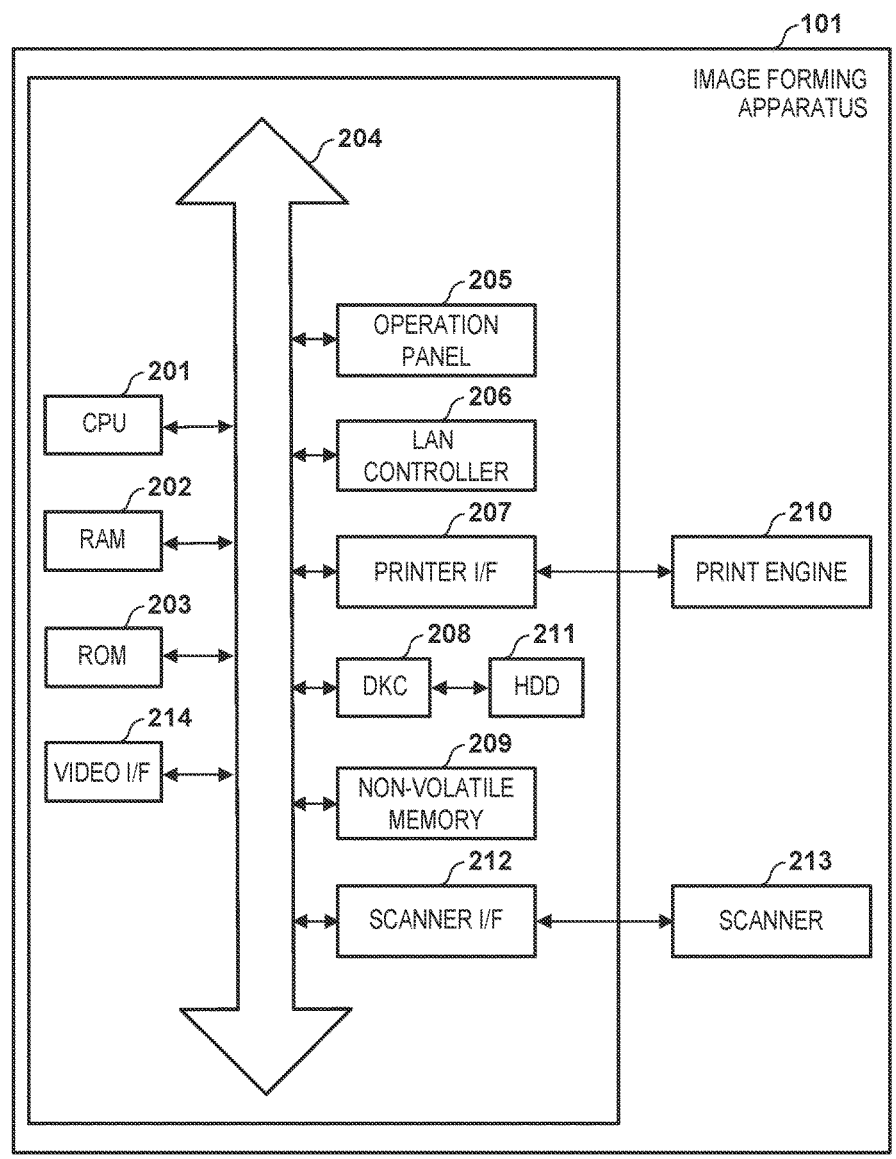
FIG. 2 is a block diagram illustrating an example of a hardware configuration of an image forming apparatus 101.

FIG. 2 is a block diagram illustrating an example of a hardware configuration of an image forming apparatus 101. A CPU 201 comprehensively controls access to various devices connected to a system bus 204 based on a control program stored in a ROM 203 or a hard disk drive (HDD) 211 in the image forming apparatus 101. The CPU 201 outputs an image signal to a printer (print engine) 210 connected via a printer interface (I/F) 207 and receives an input of an image signal from a reading unit (scanner) 213 connected via a scanner I/F 212. Also, the CPU 201 can communicate with the print control apparatus 105 via a LAN controller 206.

A RAM 202 mainly functions as a main memory, a work area, or the like of the CPU 201. The HDD 211 is an external storage apparatus and access is controlled to the HDD 211 by a disk controller (DKC) 208. Note that an IC card or the like may be used as an external storage apparatus in place of the HDD 211. The HDD 211 is used for recording application programs, font data, form data, and the like, and temporarily spooling print jobs, and is used as a job storage area for controlling a spooled job from the outside. The HDD 211 additionally stores image data such as image data obtained by reading by the scanner 213 and image data of a print job and log data such as a job log and an image log.

An operation panel 205 is configured such that a user can input various information by using software keys or hardware keys. A non-volatile memory 209 records various setting information set from an external apparatus such as the terminal apparatus 106 via the operation panel 205 or the network 104. A video I/F 214 is connected to the print control apparatus 105 and is used to receive image data from the print control apparatus 105.

<Hardware Configuration of the Print Control Apparatus 105>

FIG. 3A is a block diagram illustrating an example of a hardware configuration of the print control apparatus 105. A CPU 301 comprehensively controls access to various devices connected to a system bus 304 based on a control program recorded in a ROM 303 or an HDD 309 in the print control apparatus 105. Also, the CPU 301 can communicate with the image forming apparatus 101 via a LAN controller 306. Also, the CPU 301 can communicate with the terminal apparatus 106 and the image forming apparatus 102 via a LAN controller 307 and can also access the Internet 140.

A RAM 302 mainly functions as a main memory, a work area, or the like of the CPU 301. The HDD 309 is an external storage apparatus and access is controlled to the HDD 309 by a DKC 308. Note that an IC card or the like may be used as an external storage apparatus in place of the HDD 309. The HDD 309 is used for recording application programs, font data, form data, and the like, and temporarily spooling print jobs. The HDD 309 additionally is used to save the job again after RIP (Raster Image Processor) processing is performed for a spooled job.

An operation unit 305 is configured such that a user can input various information by using software keys or hardware keys. A video I/F 310 is connected to the image forming apparatus 101 and is used for transmitting post-RIP processing image data to the image forming apparatus 101.

<Hardware Configuration of the Terminal Apparatus 120 and the Server Apparatus 131>

FIG. 3B is a block diagram illustrating an example of a hardware configuration of the terminal apparatus 120 and the server apparatus 131. Although description is given regarding the configuration of the terminal apparatus 120 here, the configuration of the server apparatus 131 is the same. A CPU 401 performs control of various devices connected to a system bus 404 in the terminal apparatus 120. A ROM 402 records a BIOS or a boot program. A RAM 403 is used as a main memory of the CPU 401.

A keyboard controller (KBC) 405 performs control relating to an input of information by using a pointing device 409 such as a mouse and a keyboard 410. A display control unit (CRTC) 406 has an internal video memory, and renders image data in this video memory in accordance with an instruction from the CPU 401 and outputs the image data rendered in the video memory as a video signal to a display apparatus (CRT) 411. Note that a liquid crystal display apparatus or the like may be used as a display apparatus in place of the CRT 411.

A disk controller (DKC) 407 performs access to an HDD 412 and a floppy disk (FD) 413. An OS, various application programs that operate on the OS, and the like are stored in the HDD 412. A network interface card (NIC) 408 is connected to a network and performs communication via the network. When a power source of the terminal apparatus 120 enters an ON state, the CPU 401 reads the OS from the HDD 412 into the RAM 403 and executes it in accordance with a boot program stored in the ROM 402. By this, the terminal apparatus 120 functions as an information processing apparatus.

<Software Configuration of the Image Forming Apparatus 101>

Figure 4A:
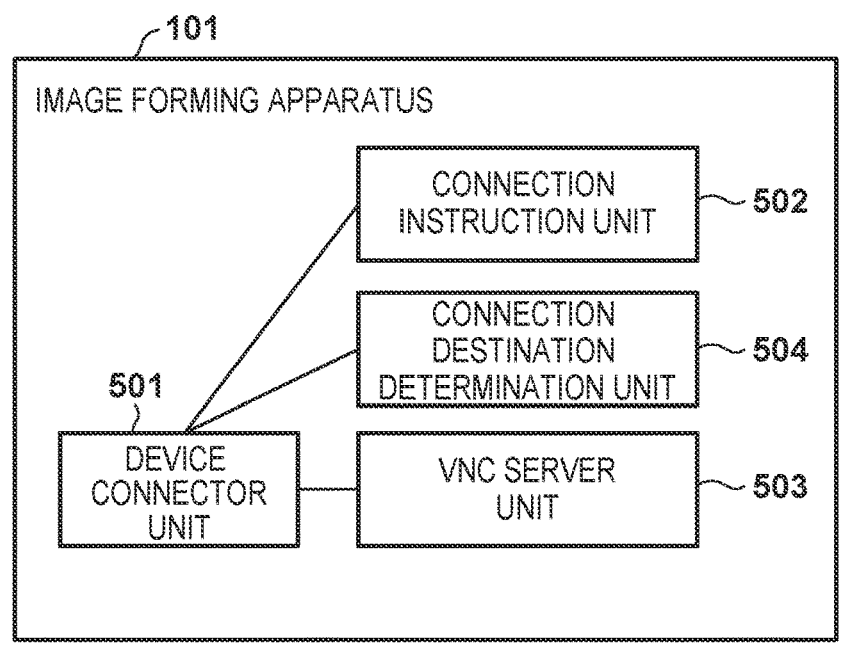
FIG. 4A is a block diagram illustrating an example of a software configuration of the image forming apparatus 101.

FIG. 4A is a block diagram illustrating an example of a software configuration of the image forming apparatus 101. Programs are stored in the HDD 211 for realizing functions of each processing unit illustrated in FIG. 4A. The functions of each processing unit are realized in the image forming apparatus 101 by the CPU 201 reading a program stored in the HDD 211 into the RAM 202 and executing it.

Figure 12A:
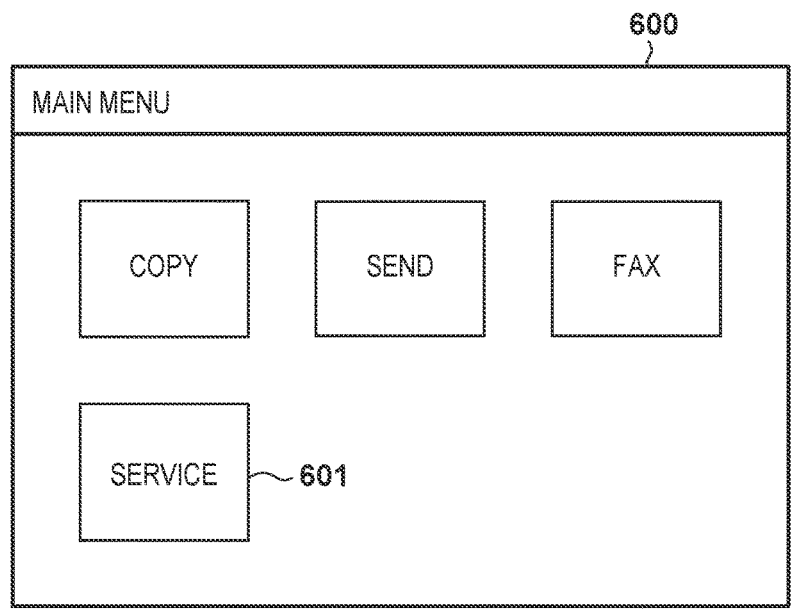
FIGS. 12A and 12B illustrate an example of screens displayed on the image forming apparatus 101.

A device connector unit 501 relays communication between a server connector unit 701 (FIG. 4B) and a VNC server unit 503 after establishing a connection with the server connector unit 701 of the server apparatus 131 when a connection instruction unit 502 receives a connection instruction instructing a connection to the server apparatus 131. The connection instruction unit 502 transmits a connection instruction to the device connector unit 501 in a case where an operation such as a pressing of a button is performed on the operation panel 205 by a user. FIG. 12A illustrates one example of a main menu screen displayed on the operation panel 205 of the image forming apparatus 101. The connection instruction unit 502 transmits a connection instruction to the device connector unit 501 when a button 601 of a main menu screen 600 is pressed by a user.

The VNC server unit 503 provides a VNC server function. The VNC server unit 503 transmits screen data of a screen that is the same as a screen displayed on the operation panel 205 to a VNC client of a connection destination in accordance with an RFB protocol when it establishes a connection by receiving a connection request (VNC connection request) based on a VNC protocol from the VNC client. For example, a remote operation of the image forming apparatus 101 from the terminal apparatus 106 is possible for a user by operating VNC client software in the terminal apparatus 106 within the user environment 110 and using a VNC server function to access the image forming apparatus 101.

Also, in a case where a service person (an operator of the terminal apparatus 120) performs remote maintenance of the image forming apparatus 101, the terminal apparatus 120 of the call-center transmits a VNC connection request to the image forming apparatus 101 via the server apparatus 131.

The VNC connection request is relayed by the device connector unit 501 and is delivered to the VNC server unit 503, and accordingly, a VNC connection is established between the terminal apparatus 120 and the image forming apparatus 101, and communication according to the VNC protocol (VNC communication) becomes possible. When the VNC connection is established, the service person can perform remote maintenance by remotely operating the image forming apparatus 101 from the terminal apparatus 120 by the VNC communication. Note that in such a case, an IP address of the source of the connection from the perspective of the VNC server unit 503 is a local loopback address because the VNC server unit 503 is connected to by VNC from the device connector unit 501.

Description is given regarding an example in which the VNC server unit 503 can communicate with only one connection destination in the present embodiment. In such a case, when the VNC server unit 503 receives a VNC connection request from another terminal apparatus during VNC communication with a terminal apparatus, it disconnects the VNC connection with the terminal apparatus to which it is already connected and performs a VNC connection with the new connection destination terminal apparatus. By this, there ceases to be a situation in which a plurality of users remotely operate the image forming apparatus 101 simultaneously, and also it is possible to prevent a connection between the terminal apparatus and the image forming apparatus 101 from being continued due to the user of terminal apparatus which performed the VNC connection leaving their seat.

However, it is necessary that the terminal apparatus 120 monopolize the VNC connection in a case where the remote maintenance is performed by performing the VNC connection to the image forming apparatus 101 from the terminal apparatus 120 of the call-center. If, for example, the terminal apparatus 106 within the user environment 110 makes a VNC connection to the image forming apparatus 101 while the remote maintenance is continuing, there is a possibility that an operation that only a service person should be permitted to perform would be performed by a general user. Also, there is a possibility that a screen that cannot be shown to a general user would be seen. Accordingly, in the present embodiment, the image forming apparatus 101 operates such that only a connection from the terminal apparatus 120 is permitted (prohibiting a VNC connection from another terminal apparatus) in a case where it establishes a VNC connection with the terminal apparatus 120 of the call-center.

When a connection destination determination unit 504 receives a VNC connection request, it determines a connection destination in accordance with the request. The connection destination determination unit 504 transmits a corresponding connection instruction to the device connector unit 501 in a case where it determines that the connection destination is the VNC server unit 503 of the image forming apparatus 101. The connection destination determination unit 504 transmits a corresponding connection instruction to the device connector unit 501 in a case where it determines that the connection destination is a VNC server unit 1001 of the print control apparatus 105 (described later).

<Software Configuration of the Server Apparatus 131>

Figure 4B:
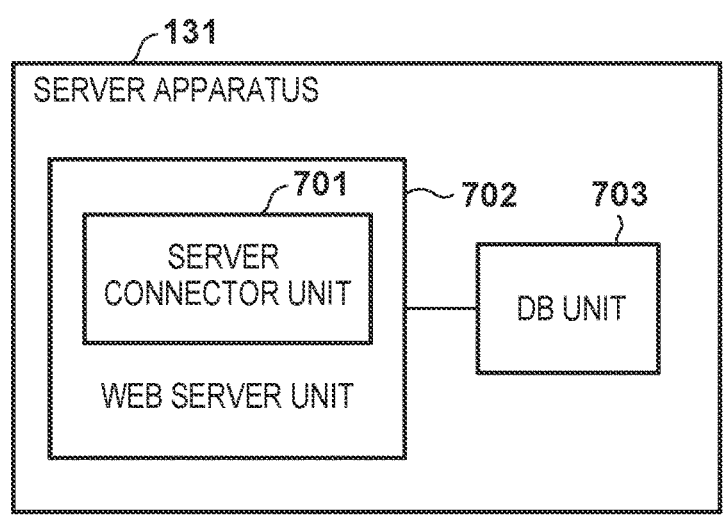
FIG. 4B is a block diagram illustrating an example of a software configuration of the server apparatus 131.

FIG. 4B is a block diagram illustrating a software configuration of the server apparatus 131. Programs are stored in the HDD 412 for realizing functions of each processing unit illustrated in FIG. 4B. The functions of each processing unit are realized in the server apparatus 131 by the CPU 401 reading a program stored in the HDD 412 into the RAM 403 and executing it.

The server connector unit 701 receives connections from the image forming apparatus 101 (the device connector unit 501) and the terminal apparatus 120 (a Web browser 901 of FIG. 9), and relays communication between the device connector unit 501 and the Web browser 901. A Web server unit 702 provides a Web server function. The Web server unit 702 generates screen data of the initial screen (FIG. 7) and transmits it to the Web browser 901 when it receives an initial connection from the Web browser 901 of the terminal apparatus 120. The Web server unit 702 additionally performs an HTTP communication with the device connector unit 501 and the Web browser 901 via the server connector unit 701. Note that in the present embodiment, although the communication between the server apparatus 131 and other apparatuses is performed by using HTTP, it may be performed by using another communication protocol such as HTTPS.

Dynamic information and static information relating to the image forming apparatus are stored in the DB unit 703. FIGS. 5A and 5B illustrate an example of information stored in the DB unit 703. The DB unit 703 includes a DB 800, illustrated in FIG. 5A, which includes static information relating to the image forming apparatus and a DB 810, illustrated in FIG. 5B, which includes dynamic information relating to a current connection state of the image forming apparatus.

The DB 800 is updated when a contract to initiate or a finish support is made between a customer and a company that manufactured/sold the image forming apparatus. The DB 800 includes a serial number 801, a model name 802, a customer name 803, and a service person name 804. The serial number 801 is a number by which the image forming apparatus can be uniquely identified. The model name 802 is a model name of the image forming apparatus. The customer name 803 is a name of the customer receiving image forming apparatus support and one customer may have a plurality of image forming apparatuses. The service person name 804 is an identification name of the service person who is responsible for the image forming apparatus support and one service person may be in charge of the support of a plurality of the image forming apparatuses.

The DB 810, as later described, is updated in a case where a connection or disconnection is performed between the server connector unit 701 and the device connector unit 501 (the image forming apparatus 101) or the Web browser 901 (the terminal apparatus 120). The DB 810 includes a serial number 811, a model name 812, a customer name 813, image forming apparatus and service person connection times 814 and 815, a corresponding service person name 816, and a connection ID 817.

Corresponding information is copied from the DB 800 for the serial number 811, the model name 812, and the customer name 813 when the server connector unit 701 receives identification information of the image forming apparatus from the device connector unit 501 (the image forming apparatus 101). The image forming apparatus connection time 814 is a time at which the server connector unit 701 is connected from the device connector unit 501 (the image forming apparatus 101). The service person connection time 815 is a time at which the server connector unit 701 is connected from the Web browser 901 (the terminal apparatus 120).

In a case where a connection is established between the Web browser 901 (the terminal apparatus 120) and the server connector unit 701, the identification name of the service person corresponding to the connected terminal apparatus 120 is stored in the corresponding service person name 816. The connection ID 817 is an ID newly assigned when a connection is performed from the image forming apparatus 101 or the print control apparatus 105, and is stored when the connection is performed. The service person of the call-center can select an apparatus that is a connection target for a remote operation (remote maintenance) based on the ID stored in the connection ID 817 as described later with reference to FIG. 7. In this way, the connection ID 817 is one example of identification information that enables the terminal apparatus 120 to identify a connection between the image forming apparatus 101 and the server apparatus 131 in the present embodiment.

<Software Configuration of the Terminal Apparatus 120>

Figure 4C:
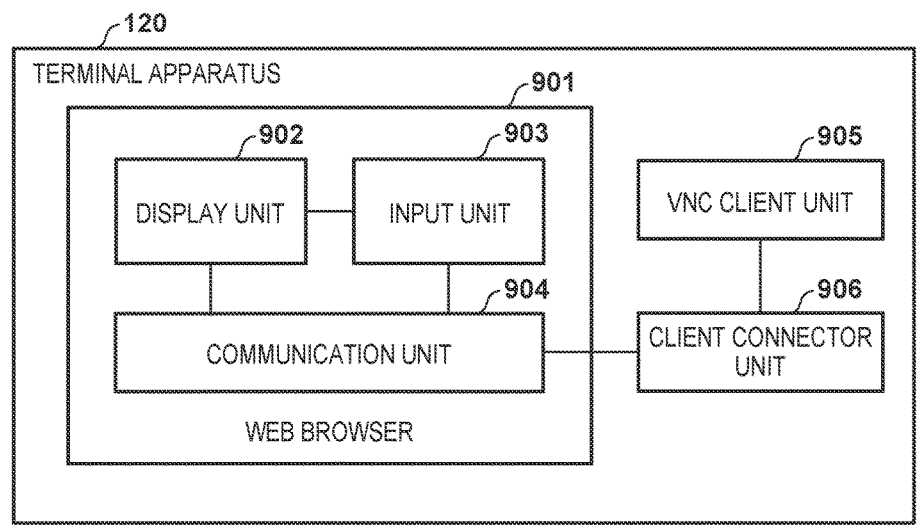
FIG. 4C is a block diagram illustrating an example of a software configuration of the terminal apparatus 120.

FIG. 4C is a block diagram illustrating an example of a software configuration of the terminal apparatus 120. Programs are stored in the HDD 412 for realizing functions of each processing unit illustrated in FIG. 4C. The functions of each processing unit are realized in the terminal apparatus 120 by the CPU 401 reading a program stored in the HDD 412 into the RAM 403 and executing it.

The Web browser 901 is a common Web browser application and includes a display unit 902, an input unit 903, and a communication unit 904. The communication unit 904 transmits input information indicating input content to a Web server (Web server 702 for example) as an HTTP request when the input unit 903 receives input from a user. When the communication unit 904 receives a response from the Web server, the display unit 902 displays, on the CRT 411, a screen based on the contents into which the response is interpreted. A VNC client unit 905 has a client function for performing a communication with the VNC server. A client connector unit 906 has a relay function for the VNC client unit 905 to perform VNC communication with a VNC server via a communication path for an HTTP communication by the Web browser 901.

<Software Configuration of the Print Control Apparatus 105>

Figure 4D:
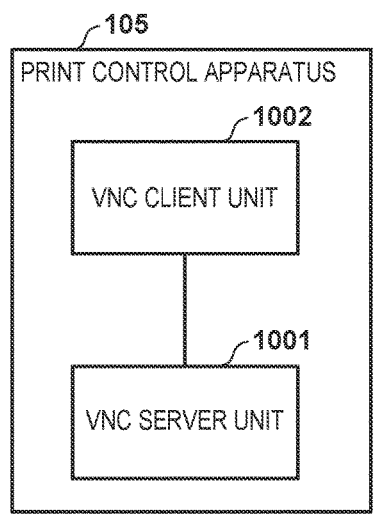
FIG. 4D is a block diagram illustrating an example of a software configuration of the print control apparatus 105.

FIG. 4D is a block diagram illustrating an example of a software configuration of the print control apparatus 105. Programs are stored in the HDD 309 for realizing functions of each processing unit illustrated in FIG. 4D. The functions of each processing unit are realized in the print control apparatus 105 by the CPU 301 reading a program stored in the HDD 309 into the RAM 302 and executing it.

The VNC server unit 1001 provides a VNC server function. The VNC server unit 1001 transmits screen data of a screen that is the same as a screen displayed on the operation unit 305 to the VNC client of the connection destination in accordance with an RFB protocol when it establishes a connection by receiving a VNC connection request from the VNC client. For example, a remote operation of the print control apparatus 105 from the terminal apparatus 106 is possible for a user by operating VNC client software in the terminal apparatus 106 within the user environment 110 and using a VNC server function to access the print control apparatus 105. A VNC client unit 1002 has a client function for performing communication with the VNC server. A packet transfer unit has a NAT or NAPT network address/port conversion function (packet transfer function).

<Procedure of a VNC Connection Between the Terminal Apparatus 120 and the Print Control Apparatus 105>

FIG. 6 is a sequence diagram illustrating a procedure for establishing a VNC connection between the terminal apparatus 120 (the Web browser 901) and the print control apparatus 105 (the VNC server unit 1001) in the remote maintenance system. Processing of each step illustrated in FIG. 6 is realized by the CPU 201 reading and executing a program stored in the HDD 211 in the image forming apparatus 101. Processing of each step is realized by the CPU 301 reading and executing a program stored in the HDD 309 in the print control apparatus 105. Processing of each step is realized by the CPU 401 reading and executing a program stored in the HDD 412 in the server apparatus 131 and the terminal apparatus 120.

Firstly, the terminal apparatus 120 and the image forming apparatus 101 both establish HTTP communication with the server apparatus 131 in the sequence illustrated in FIG. 6. Next, the terminal apparatus 120 uses the HTTP communication between the terminal apparatus 120 and the server apparatus 131 and the HTTP communication between the server apparatus 131 and the image forming apparatus 101 to perform a connection by a VNC protocol to the image forming apparatus 101 via the server apparatus 131. Thus, the VNC connection is established between the terminal apparatus 120 and the image forming apparatus 101 and a VNC communication becomes possible via the established VNC connection. Additionally, the image forming apparatus 101 transfers the VNC communication between the terminal apparatus 120 and the image forming apparatus 101 to the print control apparatus 105. Thus, the VNC connection is established between the terminal apparatus 120 and the print control apparatus 105 and a VNC communication becomes possible via the established VNC connection.

In this way, the communication between the terminal apparatus 120 and the image forming apparatus 101 is realized by using the VNC protocol over HTTP. Also, the communication between the image forming apparatus 101 and the print control apparatus 105 is realized by using the VNC protocol. Description is given regarding details of such a sequence hereinafter.

(Connection to the Server Apparatus 131 from the Image Forming Apparatus 101)

Firstly in step S1101, the connection instruction unit 502 (the image forming apparatus 101) transmits a connection instruction to the device connector unit 501 in accordance with an operation on the main menu screen 600 as described above. When the device connector unit 501 receives the connection instruction, it transmits a connection request including identification information such as a device name of the image forming apparatus 101 to the Web server unit 702 (the server apparatus 131) in step S1102. This connection request is relayed by the packet transfer unit of the print control apparatus 105 connected between the image forming apparatus 101 and the network 104. Note that the relay of the communication is performed by the packet transfer unit of the print control apparatus 105 when the image forming apparatus 101 and the terminal apparatus 120 or the server apparatus 131 perform communication.

The Web server unit 702 (the server apparatus 131) issues a connection ID when it receives the connection request from the image forming apparatus 101. Additionally, the Web server unit 702 registers identification information included in the received connection request as well as the issued connection ID in the DB unit 703 (the DB 810). Next in step S1103, the Web server unit 702 transmits the received connection request and the issued connection ID to the server connector unit 701.

The server connector unit 701 (the server apparatus 131) manages connections from a plurality of apparatuses such as the image forming apparatus 101 and the terminal apparatus 120 based on connection IDs received from the Web server unit 702. In the present embodiment, the server connector unit 701 relays communication with the plurality of apparatuses connected to the server apparatus 131 by using the same connection ID. By this, a sharing of a screen by a VNC communication becomes possible between the VNC clients (the image forming apparatus 101 and the terminal apparatus 120) connected to the server apparatus 131 by using the same connection ID, and remote maintenance of the image forming apparatus 101 is realized. The server connector unit 701 can realize remote maintenance for each connection ID because of managing an established session for each connection ID.

Although description is given regarding a case in which communication is performed by two apparatuses—the image forming apparatus 101 and the terminal apparatus 120—connecting to the server apparatus 131 in the present embodiment, communication can be performed by three or more apparatuses connecting to the server apparatus 131. Also, an issuance of a connection ID may be performed by the server connector unit 701 instead of the Web server unit 702, and in such a case, the server connector unit 701 may perform a registration to the DB 703, or the Web server unit 702, having received the connection ID from the server connector unit 701, may perform a registration to the DB 703.

(Connection to the Server Apparatus 131 from the Terminal Apparatus 120)

A connection to the server apparatus 131 from the terminal apparatus 120 used by a service person in a call-center is performed by using the Web browser 901 of the terminal apparatus 120. Description is given hereinafter regarding a procedure for the terminal apparatus 120 to connect to the server apparatus 131 based on a connection ID assigned to the image forming apparatus 101 when the image forming apparatus 101 connects to the server apparatus 131.

Firstly in step S1104, the Web browser 901 (the terminal apparatus 120) performs a connection to the Web server unit 702 (the server apparatus 131). When the Web browser 901 performs a connection to the Web server unit 702, the Web server unit 702 obtains information registered in the DB unit 703 and generates a Web page to be displayed on the terminal apparatus 120 based on the obtained information. The Web server unit 702 transmits data (screen data) of the generated Web page to the Web browser 901.

FIG. 7 illustrates one example of a Web browser screen displayed by the Web browser 901 based on the screen data transmitted from the Web server unit 702 when the Web browser 901 performs the connection to the Web server unit 702. The serial number of the image forming apparatus as well as the model name of the image forming apparatus and the customer name (company name) are registered in the DB unit 703 as illustrated in FIGS. 5A and 5B. The model name of the image forming apparatus is displayed on the screen 1200 as a device name 1201 grouped by company name based on the information registered in the DB 703. Note that an MFP (Multi Function Peripheral) represents an image forming apparatus. On the screen 1200, the service person can select a check-box 1202 corresponding to the device name of the image forming apparatus which is the connection destination and instruct a connection to the VNC server of the image forming apparatus of the connection destination by pressing a connect button 1203.

A connection ID 1204 associated with each image forming apparatus (MFP) is displayed on the screen 1200. Each connection ID corresponds to an image forming apparatus that connected to the Web server unit 702 (the server apparatus 131) and is awaiting a connection from the terminal apparatus 120 via the server connector unit 701. Three MFPs (an MFP 1, an MFP 2, and an MFP 3) are connected to the server apparatus 131 in the example illustrated in FIG. 7. Among these MFPs, the MFP 1 of company A has already connected to by (the terminal apparatus of) the service person "serv1". As described above, a check-box corresponding to the MFP 1 is grayed out so that it cannot be selected because a plurality of terminal apparatuses cannot connect to one image forming apparatus (MFP) at the same time.

The service person specifies the image forming apparatus for which remote maintenance is to be performed and selects the image forming apparatus which is to be the connection target, based on information such as the connection ID 1204 displayed on the screen 1200. After this, the Web browser 901 transmits a connection request including the connection ID corresponding to the selected image forming apparatus to the Web server unit 702 when the service person presses the connect button 1203. By this, a request for a connection to the VNC server of the image forming apparatus 101 to which the connection ID included in the connection request is assigned is made to the Web server unit 702.

When the above described connection request transmitted from the terminal apparatus 120 is received, the Web server unit 702 (the server apparatus 131), in step S1105, transmits to the server connector unit 701 a request for connection to the image forming apparatus 101 based on the connection ID included in the received connection request. By this, the server connector unit 701 establishes a connection with the device connector unit 501 of the image forming apparatus 101 to which the connection ID is assigned. By this, a connection is established between the server apparatus 131 (the server connector unit 701) and the image forming apparatus 101 (the device connector unit 501).

As a result, the connection between the terminal apparatus 120 and the image forming apparatus 101 to which the connection ID included in the connection request transmitted from the terminal apparatus 120 is assigned is established via the server apparatus 131 (the server connector unit 701). Specifically, the server connector unit 701 serves as a server to establish a connection with a plurality of clients (the terminal apparatus 120 and the image forming apparatus 101) and relays data transmitted from one client to the other client.

For example, transmission of data from the image forming apparatus 101 (the device connector unit 501) to the terminal apparatus 120 (the Web browser 901) is performed in the following way by using HTTP communication. Firstly, the server apparatus 131 (the server connector unit 701) awaits transmission of data from the image forming apparatus 101 (the device connector unit 501). The image forming apparatus 101 (the device connector unit 501) transmits the data in a POST request in a case where it transmits the data to the server apparatus 131 (the server connector unit 701). After this, the server apparatus 131 (the server connector unit 701) transmits the received data to the terminal apparatus 120 (the Web browser 901). At that time, the server apparatus 131 (the server connector unit 701) transmits the data to the terminal apparatus 120 (the Web browser 901) as a response to a GET request that the terminal apparatus 120 had already transmitted to the server apparatus 131 (the server connector unit 701). In this way, it is possible to transmit the data by HTTP communication from the image forming apparatus 101 (the device connector unit 501) to the terminal apparatus 120 (the Web browser 901) via the server apparatus 131 (the server connector unit 701).

(VNC Connection Between the Terminal Apparatus 120 and the Print Control Apparatus 105)

When a connection is established between the server connector unit 701 (the server apparatus 131) and the device connector unit 501 (the image forming apparatus 101) in step S1105, the VNC client unit 905 (the terminal apparatus 120) transmits a VNC connection request in step S1106. Specifically, a service person using the terminal apparatus 120 makes, on the display screen of the Web browser 901, an instruction for a connection to the VNC server of the print control apparatus 105 connected to the image forming apparatus 101. By this, the VNC client unit 905 activates, and the VNC client unit 905 transmits a VNC connection request to the client connector unit 906. Note that the client connector unit 906 also activates together with the activation of the VNC client unit 905.

When the client connector unit 906 (the terminal apparatus 120) receives the VNC connection request from the VNC client unit 905, it transmits the VNC connection request to the server connector unit 701 (the server apparatus 131) as HTTP data in step S1107. The client connector unit 906 appropriately processes and transmits the VNC connection request as HTTP data to perform a communication which uses the VNC protocol over HTTP.

When the server connector unit 701 (the server apparatus 131) receives a VNC connection request from the terminal apparatus 120 as HTTP data, it transmits (relays) the VNC connection request to the device connector unit 501 (the image forming apparatus 101) in step S1108. The device connector unit 501 (the image forming apparatus 101) confirms whether a VNC connection request is included in the received HTTP data. The device connector unit 501 performs a connection to the VNC server unit 1001 (the print control apparatus 105) in step S1109, in a case where a VNC connection request is included in the HTTP data and the request is a request for a connection to the print control apparatus 105. By this, a VNC connection is established between the device connector 501 (the image forming apparatus 101) and the VNC server unit 1001 (the print control apparatus 105). As a result, a VNC connection is established between the Web browser 901 (the terminal apparatus 120) and the VNC server unit 1001 (the print control apparatus 105).

As described above, when a VNC connection is established between the Web browser 901 (the terminal apparatus 120) and the VNC server unit 1001 (the print control apparatus 105), VNC communication between them becomes possible. Note that the VNC server unit 1001, in accordance with a VNC communication being initiated, may activate the VNC client unit 1002 and transmit a VNC connection request to the VNC server 503 of the image forming apparatus 101. In such a case, the terminal apparatus 120 becomes possible to perform VNC communication with the image forming apparatus 101 via the print control apparatus 105.

In this way, the image forming apparatus 101 of the present embodiment connects to the server apparatus 131 which relays communication between the print control apparatus 105 and the terminal apparatus 120. Additionally, the image forming apparatus 101 establishes communication (VNC communication) with the terminal apparatus 120 via the server apparatus 131 and communication (VNC communication) with the print control apparatus 105. By this, remote maintenance of the print control apparatus 105 and the image forming apparatus 101 by the terminal apparatus 120 is made possible. Hereinafter, as the first to third embodiments, description is given regarding operation of the print control apparatus 105 and the image forming apparatus 101 in a case where the print control apparatus 105 restarts in accordance with an instruction from the terminal apparatus 120 while remote maintenance by the terminal apparatus 120 is continuing.

First Embodiment

In the first embodiment, in a case where a restart of the print control apparatus 105 is instructed from the terminal apparatus 120 while remote maintenance by the terminal apparatus 120 is continuing, the print control apparatus 105 notifies the image forming apparatus 101 that the print control apparatus 105 will restart. Additionally, in a case where the restart of the print control apparatus 105 is completed, the print control apparatus 105 instructs the image forming apparatus 101 to reconnect to the server apparatus 131. This enables the image forming apparatus 101 to know an activation state of the print control apparatus 105 when the print control apparatus 105 restarts. Also, the image forming apparatus 101 is enabled to automatically reconnect to a network in accordance with the activation state of the print control apparatus. Hereinafter, description is given regarding specific processing by the print control apparatus 105 and the image forming apparatus 101.

<Processing of the Print Control Apparatus 105>

FIG. 8 is a flowchart illustrating a procedure of processing executed by the print control apparatus 105 when the print control apparatus 105 restarts, according to the first embodiment. The processing of each step of FIG. 8 is realized in the print control apparatus 105 by the CPU 301 reading and executing a program stored in the HDD 309.

In step S1301, the CPU 301 determines whether or not to initiate restart processing of the print control apparatus 105. The restart processing of the print control apparatus 105 is initiated by, for example, an instruction from a user on the print control apparatus 105, or an instruction from the terminal apparatus 120 during execution of remote maintenance. The CPU 301 determines to initiate the restart processing in a case where, for example, a restart instruction is received from the terminal apparatus 120 by a remote operation via a VNC connection. The CPU 301 advances the processing to step S1302 if determining to initiate the restart processing.

In step S1302, the CPU 301 determines whether or not there is a current VNC connection (specifically, it is in a state in which remote maintenance of the print control apparatus 105 from the terminal apparatus 120 is possible by a VNC communication). The CPU 301 advances the processing to step S1303 in a case where it determines that there is no current VNC connection. This corresponds to a case where the restart instruction was not performed by a remote operation (remote maintenance). Accordingly, the CPU 301 does not execute the processing of step S1305 through step S1313 but performs the restart processing by a normal procedure in step S1303 and step S1304. In step S1303, the CPU 301 initiates restart processing of the print control apparatus 105. When the print control apparatus 105 restarts, the CPU 301, in step S1304, performs predetermined processing for activation after the restart and ends the processing.

Meanwhile, the CPU 301 advances the processing to step S1305 in a case where it determines that there is a current VNC connection in step S1302. In step S1305, the CPU 301 transmits, to the image forming apparatus 101, a restart notification indicating that a restart of the print control apparatus 105 is instructed. The restart notification is transmitted in order to indicate to the image forming apparatus 101 that the print control apparatus 105 will restart subsequently. The image forming apparatus 101, by saving information of the restart notification received from the print control apparatus 105, can determine that the cause of the disconnection is a restart of the print control apparatus 105 in a case where the connection with the server apparatus 131 (the VNC connection with the terminal apparatus 120) is disconnected.

After the transmission of the restart notification, the CPU 301, in step S1306, sets a reconnect flag to ON in order to be able to determine after a restart that the restart is performed during the VNC connection. A setting of the reconnect flag is saved in a file system as a file. The CPU 301 initiates restart processing of the print control apparatus 105 in step S1307 when the setting of the reconnect flag is completed. When the print control apparatus 105 restarts, the CPU 301, in step S1308, performs predetermined processing for activation after the restart. After this, the CPU 301, in step S1309, determines whether or not the reconnect flag is set to ON, and ends the processing in a case where it is not set to ON (is set to OFF) and advances the processing to step S1310 in a case where it is set to ON.

In step S1310, the CPU 301 determines whether or not the network connection is normal. Specifically, the CPU 301 determines whether or not it is possible to access an external apparatus such as the terminal apparatus 106 and the image forming apparatus 102 via the LAN controller 307 or access the Internet 140. The CPU 301 advances the processing to step S1311 in a case where it is determined that the network connection is normal, and advances the processing to step S1313 in a case where it is determined that the network connection is not normal. In step S1313, the CPU 301 transmits error information to the image forming apparatus 101 and ends the processing. Note that configuration may be taken to not perform the transmission of the error information to the image forming apparatus 101 in a case where the network connection of the LAN controller 306 connected to the image forming apparatus 101 is not normal.

In step S1311, the CPU 301 determines whether or not the packet transfer unit has activated normally after the restart of the print control apparatus 105. The CPU 301 advances the processing to step S1313 in a case where the packet transfer unit has not activated normally, transmits the error information to the image forming apparatus 101, and ends the processing. Note that in a case where the packet transfer unit has not activated, the CPU 301 may wait on the activation of the packet transfer unit for a fixed period or may perform the restart processing of the packet transfer unit again. Meanwhile, the CPU 301 advances the processing to step S1312 in a case where the packet transfer unit has activated normally. In step S1312, the CPU 301 transmits, to the image forming apparatus 101, a reconnection instruction for instructing the image forming apparatus 101 to reconnect to the server apparatus 131, and ends the processing. In this way, the CPU 301 transmits the reconnection instruction in a case where, after the restart of the print control apparatus 105 is completed, access to the network becomes possible from the print control apparatus 105 and a relay of communication between the network and the image forming apparatus 101 becomes possible.

<Processing of the Image Forming Apparatus 101>

Figure 9:
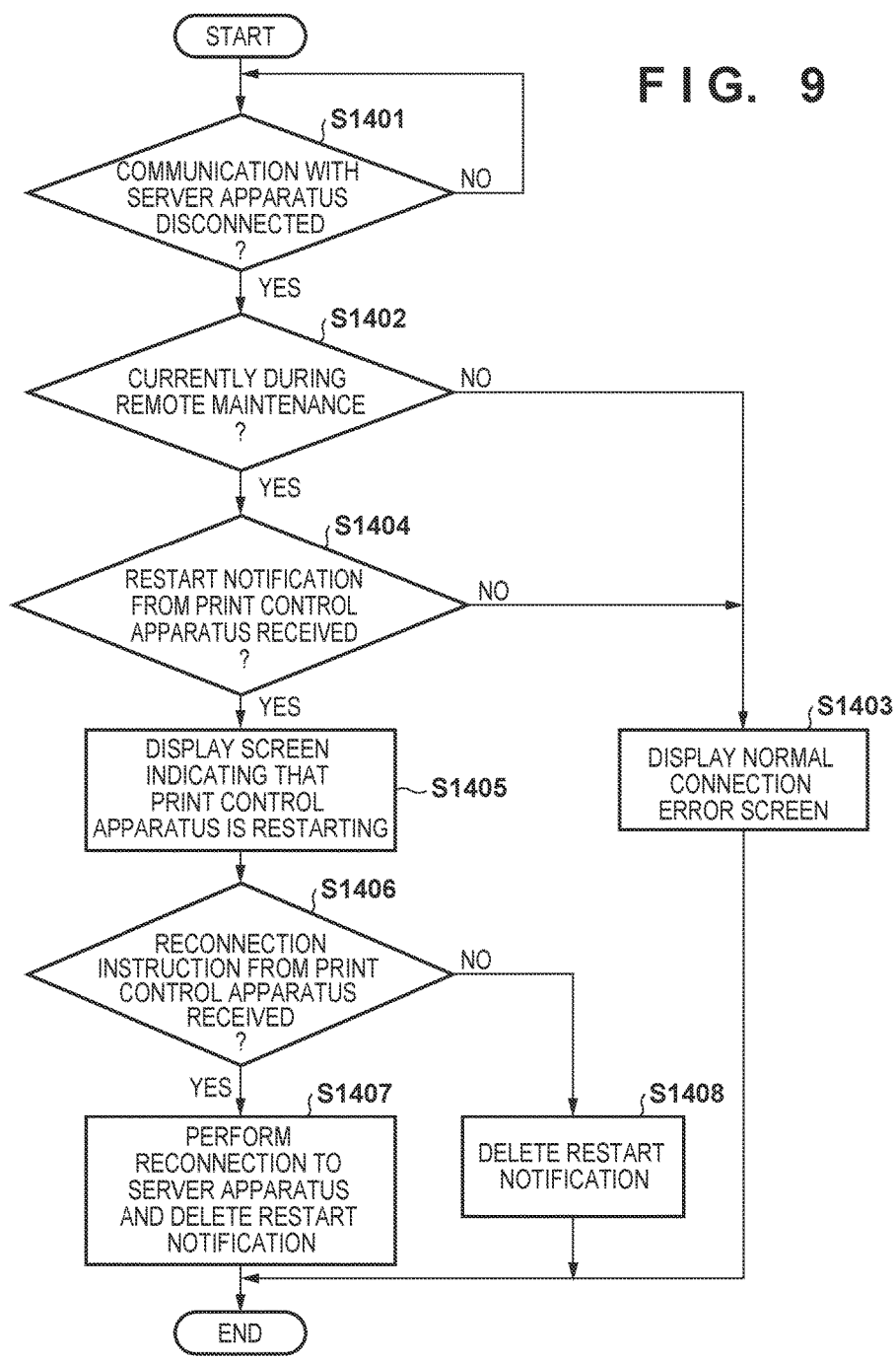
FIG. 9 is a flowchart illustrating a procedure of processing by the image forming apparatus 101 according to the first embodiment.

FIG. 9 is a flowchart illustrating a procedure of processing executed by the image forming apparatus 101 when the print control apparatus 105 restarts, according to the first embodiment. The processing of each step of FIG. 9 is realized in the image forming apparatus 101 by the CPU 201 reading and executing a program stored in the HDD 211.

In step S1401, when it is detected that the communication (connection) established with the server apparatus 131 is disconnected, the CPU 201 advances the processing to step S1402. In step S1402, the CPU 201 determines whether or not remote maintenance by remote operation is currently continuing (during remote maintenance). For example, it is determined that the remote maintenance is currently continuing in a case where communication between the device connector unit 501 of the image forming apparatus 101 and the server connector unit 701 of the server apparatus 131 has been established, and data is transmitted to the print control apparatus 105 via a VNC connection.

The CPU 201 advances the processing to step S1403 in a case where remote maintenance is not continuing. In step S1403, the CPU 201 displays a normal connection error screen (not shown) on the operation panel 205 and ends the processing. This connection error screen corresponds to a screen displayed when the communication with the server apparatus 131 is disconnected in a case where the print control apparatus 105 has not connected. Meanwhile, the CPU 201 advances the processing to step S1404 in a case where the remote maintenance is currently continuing. In this way, the processing is advanced from step S1402 to step S1404 in a case where only the print control apparatus 105 restarts without the power supply state of the image forming apparatus 101 being changed and the service person uses the terminal apparatus 120 to continue the remote maintenance.

In step S1404, the CPU 201 determines whether or not a restart notification (step S1305) is received from the print control apparatus 105 when it is detected that a communication established with the server apparatus 131 is disconnected. In a case where the restart notification is not received, the print control apparatus 105 continues to maintain a state in which it is activated without restarting. Specifically, there is a high possibility that, rather than a restart of the print control apparatus 105, the cause of a disconnection of the communication with the server apparatus 131 is, for example, an abnormality of the network beyond the print control apparatus 105, or a disconnection of the connection by the server apparatus 131, or the like. Accordingly, in a case where the restart notification is not received, the CPU 201 advances the processing to step S1403, displays a normal connection error screen on the operation panel 205, and ends the processing. Meanwhile, in a case where the restart notification is received, the CPU 201 saves the notification information of the restart notification and advances the processing to step S1405.

Figure 12B:
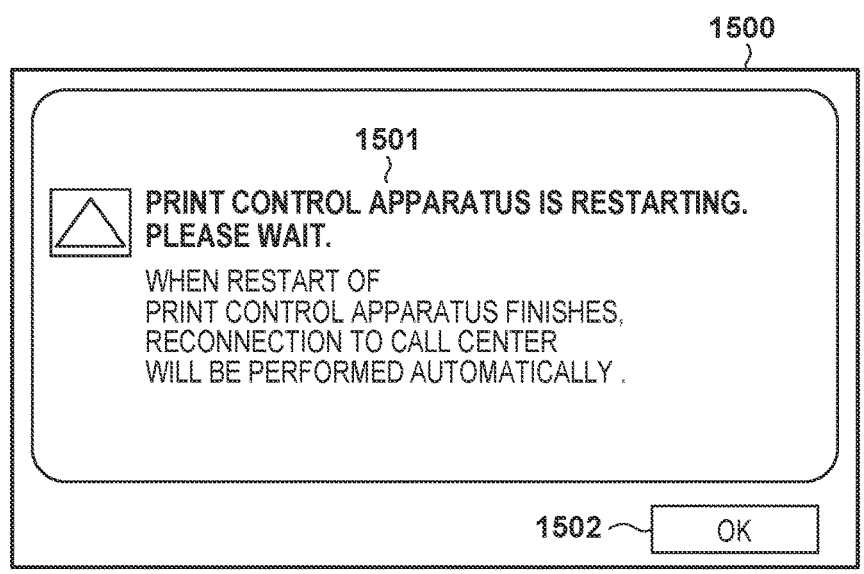

In step S1405, the CPU 201 displays a screen indicating that the print control apparatus 105 is currently restarting on the operation panel 205. FIG. 12B illustrates one example of a screen displayed on the operation panel 205 in step S1405. A screen 1500 includes a message 1501 indicating that the print control apparatus 105 is currently restarting. A user using the image forming apparatus 101 can know from the message 1501 that the print control apparatus 105 is currently restarting and that reconnection to the call-center will be performed automatically after the restart finishes.

By the user pressing an OK button 1502 in the screen 1500, the display of the screen 1500 may finish and it may be possible to perform another operation by using the operation panel 205 until the restart of the print control apparatus 105 is completed. The display of the screen 1500 finishes when the image forming apparatus 101 completes the reconnection with the server apparatus 131. Note that screen data of the screen 1500 may be saved in advance to the image forming apparatus 101 or may be transmitted from the print control apparatus 105 to the image forming apparatus 101.

When the screen is displayed on the operation panel 205 in step S1405, the CPU 201, next in step S1406, determines whether or not a reconnection instruction is received from the print control apparatus 105. The reconnection instruction is transmitted from the print control apparatus 105 in order to instruct the image forming apparatus 101 to reconnect to the server apparatus 131. In step S1406, the CPU 201 determines whether or not the reconnection instruction is received within a fixed period by awaiting a reconnection instruction from the print control apparatus 105 for the fixed period. Alternatively, the CPU 201 may confirm the power supply state of the print control apparatus 105 by using a communication protocol such as SNMP, and may confirm a reconnection instruction with the print control apparatus 105 if the print control apparatus 105 is activated. The CPU 201 advances the processing to step S1407 in a case where the reconnection instruction is received from the print control apparatus 105, and advances the processing to step S1408 in a case where the reconnection instruction is not received.

In step S1407, the CPU 201 performs the reconnection with the server apparatus 131 in accordance with a sequence described using FIG. 6. After this, the CPU 201 deletes the notification information of the restart notification saved in step S1404 and ends the processing. Meanwhile, in step S1408, the CPU 201 deletes the notification information of the restart notification saved in step S1404 and ends the processing. Note that in step S1408, the CPU 201 may confirm the state of the print control apparatus 105 and may display the state of the print control apparatus 105 on the operation panel 205 of the image forming apparatus 101.

Figure 13A:
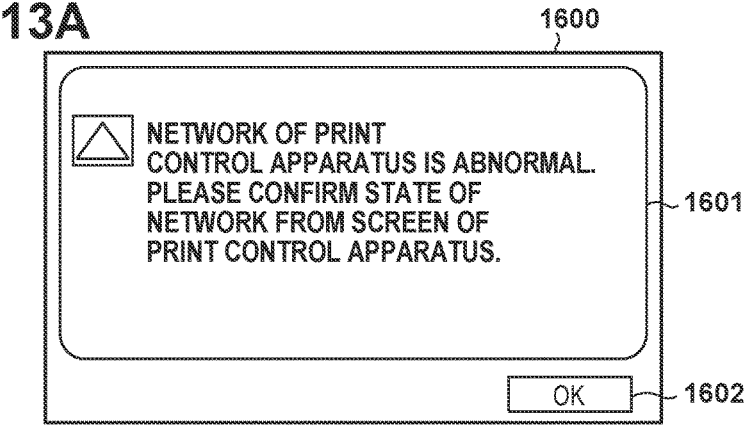
FIGS. 13A-13C illustrate an example of screens displayed on the image forming apparatus 101.
Figure 13B:
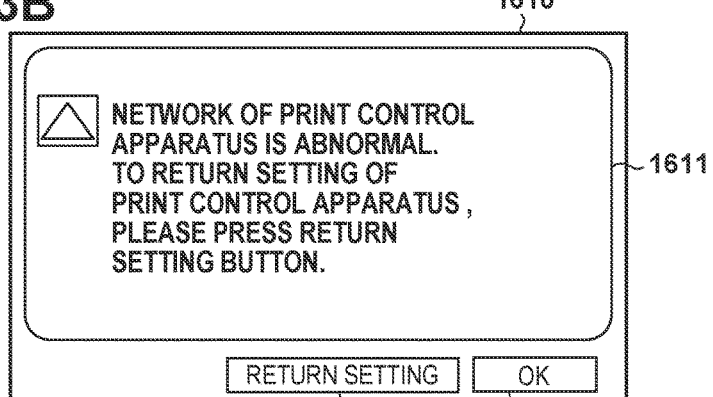

FIGS. 13A and 13B are views illustrating an example of screens that can be displayed on the operation panel 205 in step S1408. Note that screen data of a screen 1600 illustrated in FIG. 13A and a screen 1610 illustrated in FIG. 13B may be saved in advance to the image forming apparatus 101 or may be transmitted from the print control apparatus 105 to the image forming apparatus 101.

The screen 1600 illustrated in FIG. 13A is an example of a screen displayed in a case where an abnormality occurs in the LAN controller 307 of the print control apparatus 105 after a restart of the print control apparatus 105. The CPU 201 displays the screen 1600 on the operation panel 205 based on error information transmitted from the image forming apparatus 101 in step S1313. The screen 1600 includes a message 1601 indicating that an abnormality has occurred in the LAN controller 307 of the print control apparatus 105.

Note that, by the user pressing an OK button 1602 in the screen 1600, the display of the screen 1600 may finish and it may be possible to perform another operation by using the operation panel 205 until when the abnormality of the print control apparatus 105 is resolved. Also, the screen 1600 may include a reconnect button for instructing a reconnection to the server apparatus 131 after the abnormality of the print control apparatus 105 is resolved.

The screen 1610 illustrated in FIG. 13B is an example of a variation of screen 1600, which is displayed in a case where an abnormality occurred in the LAN controller 307 of the print control apparatus 105 after a restart of the print control apparatus 105. The screen 1610 illustrated in FIG. 13B is displayed in a case where an abnormality occurs in the LAN controller 307 after a service person changed a setting on the print control apparatus 105 by a remote operation from the terminal apparatus 120 and caused the print control apparatus 105 to restart. In such a case, there is a possibility that an abnormality will be resolved by returning the setting changed prior to the restart of the print control apparatus 105 to the original setting. Accordingly, the screen 1610 indicates that an abnormality occurred in the LAN controller 307 of the print control apparatus 105 and includes a message 1611 confirming whether or not to change the setting back to the original setting. Additionally, the screen 1610 includes a button 1613 for making an instruction to return the changed setting to the original setting. The CPU 201 instructs the print control apparatus 105 to return the setting changed prior to the restart to the original setting in a case where a user presses the return button 1613 in the screen 1610.

In a case where the print control apparatus 105 receives such an instruction from the image forming apparatus 101, it returns the setting changed by the remote operation from the terminal apparatus 120 to the original setting and executes restart processing. Note that, by the user pressing an OK button 1612 in the screen 1610, the display of the screen 1610 may finish and it may be possible to perform another operation by using the operation panel 205 until when the abnormality of the print control apparatus 105 is resolved. Also, the print control apparatus 105 may again execute the processing in accordance with the flowchart illustrated in FIG. 8 so that the image forming apparatus 101 can reconnect to the server apparatus 131 after the restart of the print control apparatus 105. Also, in a case where a reconnection to the server apparatus 131 is not necessary after the restart of the print control apparatus 105, a screen for a confirmation regarding the necessity of a reconnection after the restart to the print control apparatus 105 may be displayed to the user on the print control apparatus 105 or the image forming apparatus 101. In such a case, the image forming apparatus 101 may perform a reconnection to the server apparatus 131 in accordance with an instruction by the user.

By virtue of the present embodiment, in a case where the print control apparatus 105 restarts by using a remote maintenance function from the terminal apparatus 120 on the network side, it becomes possible to notify a user of a restart state of the print control apparatus 105 by using the operation panel 205 of the image forming apparatus 101. Additionally, after the print control apparatus 105 restarts, it becomes possible for the image forming apparatus 101 to automatically reconnect to the server apparatus 131 when the print control apparatus 105 enters a state in which communication is possible. Accordingly, it is possible to improve convenience of a user of the image forming apparatus 101 and the print control apparatus 105. Also, it is possible to improve convenience of a service person (operator) of a call-center because the image forming apparatus 101 can automatically reestablish a VNC communication with the terminal apparatus 120 by connecting to the server apparatus 131.

Second Embodiment

In the second embodiment, the image forming apparatus 101 saves information necessary for reconnecting with the server apparatus 131 and reconnects to the server apparatus 131 by using the saved information when the print control apparatus 105 restarts similarly to the first embodiment. Description regarding the processing executed by the print control apparatus 105 is omitted because it is the same as in the first embodiment. Below, the present embodiment is described focusing on points of difference with the first embodiment.

Figure 10B:
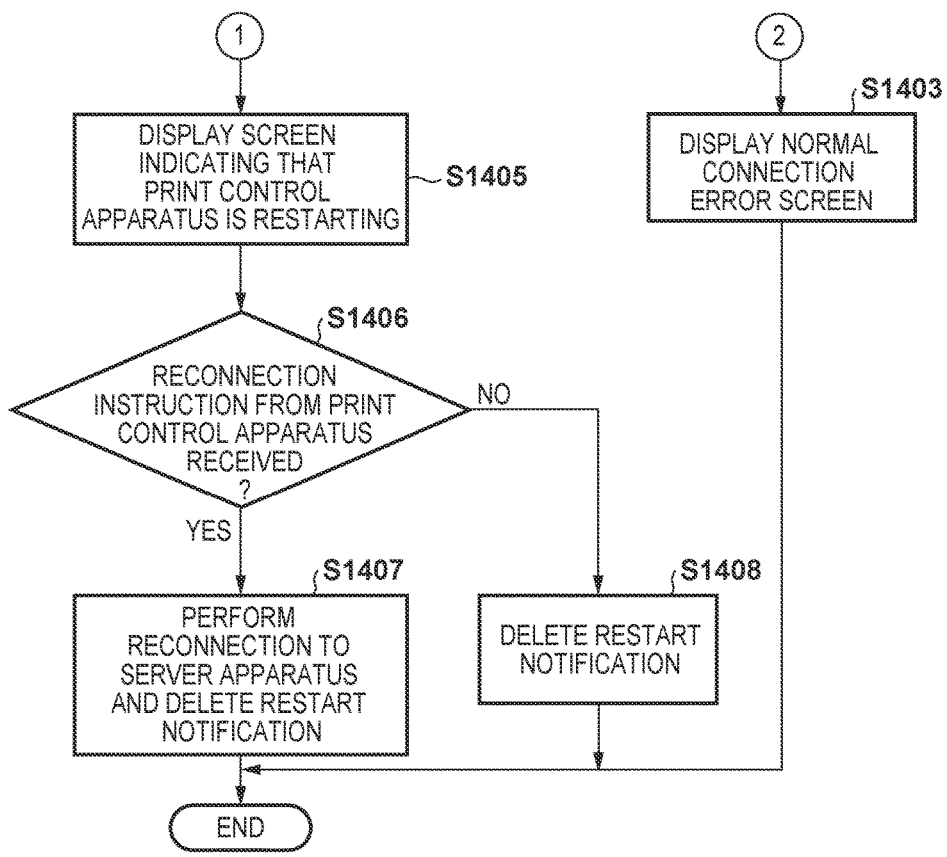

FIGS. 10A and 10B are flowcharts illustrating a procedure of processing executed by the image forming apparatus 101 when the print control apparatus 105 restarts, according to the second embodiment. In FIGS. 10A and 10B, step S1701 through step S1703 are added between step S1404 and step S1405 in comparison to the flowchart of the first embodiment illustrated in FIG. 9. The processing of each step of FIGS. 10A and 10B is realized in the image forming apparatus 101 by the CPU 201 reading and executing a program stored in the HDD 211.

The processing of step S1401 through step S1404 is the same as in the first embodiment. In the image forming apparatus 101 of the present embodiment, the CPU 201 advances the processing to step S1701 in a case where it receives a restart notification from the print control apparatus 105 in step S1404.

In step S1701, the CPU 201 determines whether or not to save information, among information relating to the server apparatus 131 which is currently connected, that is necessary for a reconnection together with notification information of the restart notification. Regarding this determination, a confirmation to the user may be performed by a screen displayed on the operation panel 205 and may be performed in accordance with an instruction from the user for example. The CPU 201 advances the processing to step S1702 in a case where it determines to not save the information for a reconnection, and advances the processing to step S1703 when it determines to save the information for a reconnection.

In step S1702, the CPU 201 saves the notification information of the received restart notification and advances the processing to step S1405. Meanwhile, the CPU 201, in step S1703, saves the information for a reconnection to the currently connected server apparatus 131 together with the notification information of the received restart notification and advances the processing to step S1405. The information for a reconnection saved in step S1703 is information (a setting value) that the server apparatus 131 or the terminal apparatus 120 dynamically generates. In the present embodiment, a connection ID (817 of FIG. 5B and 1204 of FIG. 7) necessary for communication between the server apparatus 131 and the terminal apparatus 120 is saved in step S1703 as information for a reconnection. Note that configuration may be taken such that information that is already saved and used in the image forming apparatus 101 such as an IP address of the server apparatus 131 is not be saved again in step S1703.

As described above, the server apparatus 131 manages connection IDs in order for remote maintenance of a plurality of image forming apparatuses to be possible and in order to perform a connection between an image forming apparatus (such as the image forming apparatus 101) and a terminal apparatus that the service person uses (such as the terminal apparatus 120). The connection ID is issued by the server apparatus 131 when the image forming apparatus 101 connects to the server apparatus 131 (when the server apparatus 131 receives a connection request from the image forming apparatus 101). The issued connection ID is assigned to the image forming apparatus 101 of the transmission source of the connection request. When the terminal apparatus 120 connects to the image forming apparatus 101 that is the target of remote maintenance, it performs a connection to the image forming apparatus 101 via the server apparatus 131 by connecting to the server apparatus 131 using the connection ID assigned to that image forming apparatus 101.

Accordingly, in order for the image forming apparatus 101, for which the remote maintenance from the terminal apparatus 120 was being performed using the connection ID, to perform communication with the same terminal apparatus 120 again after communication (connection) with the server apparatus 131 is disconnected, the connection ID that was being used previously is necessary. Accordingly, in the present embodiment, the image forming apparatus 101 saves the connection ID as information for a reconnection in step S1703. By this, the image forming apparatus 101, by reconnecting to the server apparatus 131 using the saved connection ID, becomes possible to perform VNC communication by establishing a VNC connection once again with the terminal apparatus 120 which is using that connection ID.

The CPU 201 advances the processing to step S1405 after executing the processing of step S1702 or step S1703. The processing of step S1405 through step S1408 is basically the same as in the first embodiment. However, in step S1407, in a case where the information for reconnection (connection ID) saved in step S1703 exists, the CPU 201 performs a reconnection with the server apparatus 131 by using the saved information for a reconnection. Specifically, the device connector unit 501 of the image forming apparatus 101 transmits the saved connection ID to the server apparatus 131. The server connector unit 701 of the server apparatus 131 establishes a connection with the client connector unit 906 of the terminal apparatus 120 based on the connection ID received from the image forming apparatus 101. By this, the image forming apparatus 101 becomes possible to perform a VNC communication by performing a reconnection, via the server apparatus 131, with the connected terminal apparatus 120 for remote maintenance prior to a restart of the print control apparatus 105, and a continuation of remote maintenance becomes possible.

By virtue of the present embodiment, similarly to the first embodiment, it is possible to notify a user of a restart state of the print control apparatus 105 by using the operation panel 205 of the image forming apparatus 101. Additionally, the image forming apparatus 101 becomes possible to reliably reestablish a VNC communication with the terminal apparatus 120 by automatically reconnecting to the server apparatus 131 using a saved connection ID after the print control apparatus 105 restarts.

Third Embodiment

In the third embodiment, in a case where the print control apparatus 105 restarts while remote maintenance of the image forming apparatus 101 is being performed by a VNC communication from the terminal apparatus 120, processing for causing the image forming apparatus 101 to restart together with the print control apparatus 105 is performed. Below, the present embodiment is described focusing on points of difference with the first embodiment.

Figure 11A:
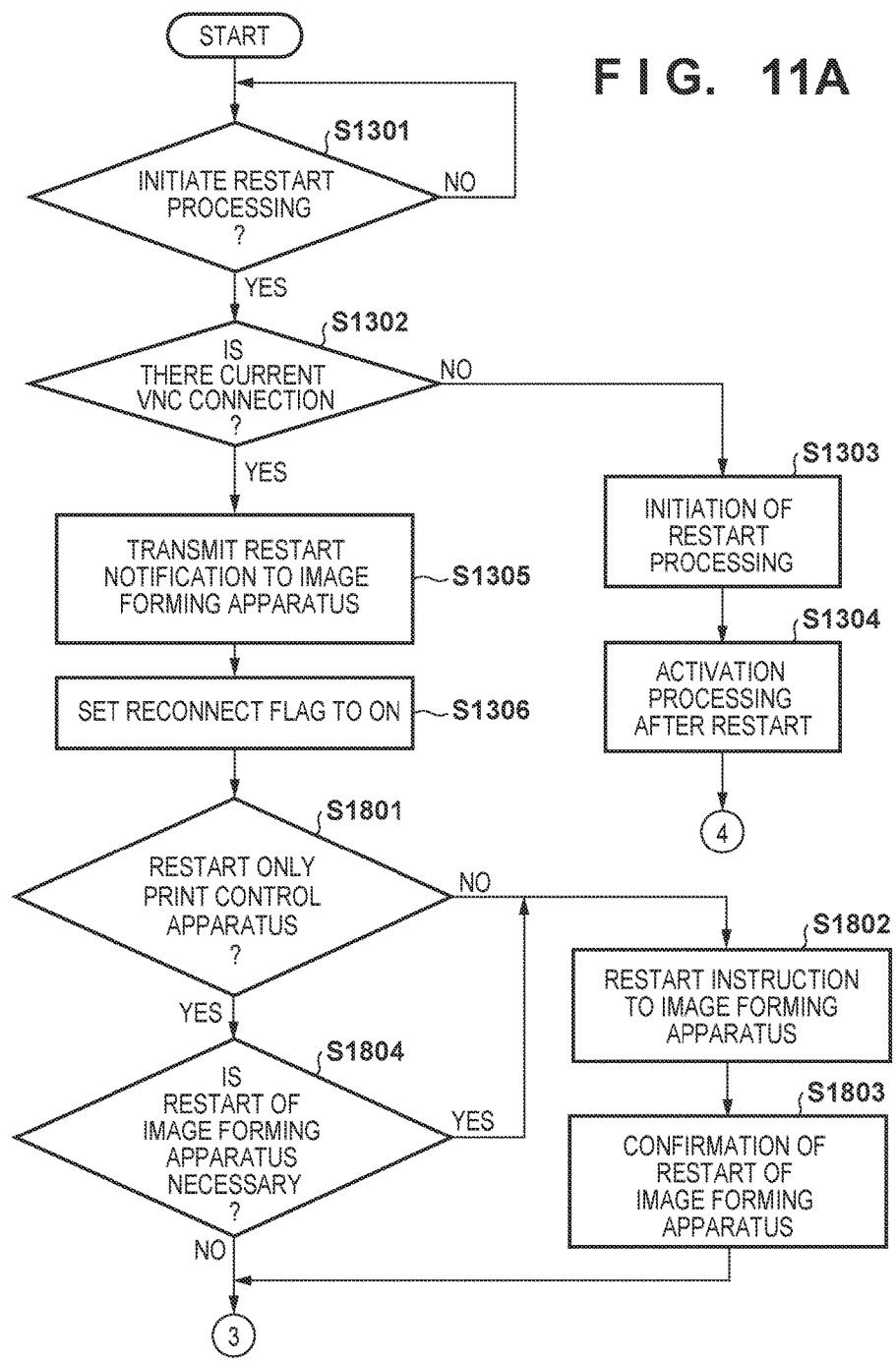
FIGS. 11A and 11B are flowcharts illustrating a procedure of processing by the print control apparatus 105 according to a third embodiment.
Figure 11B:
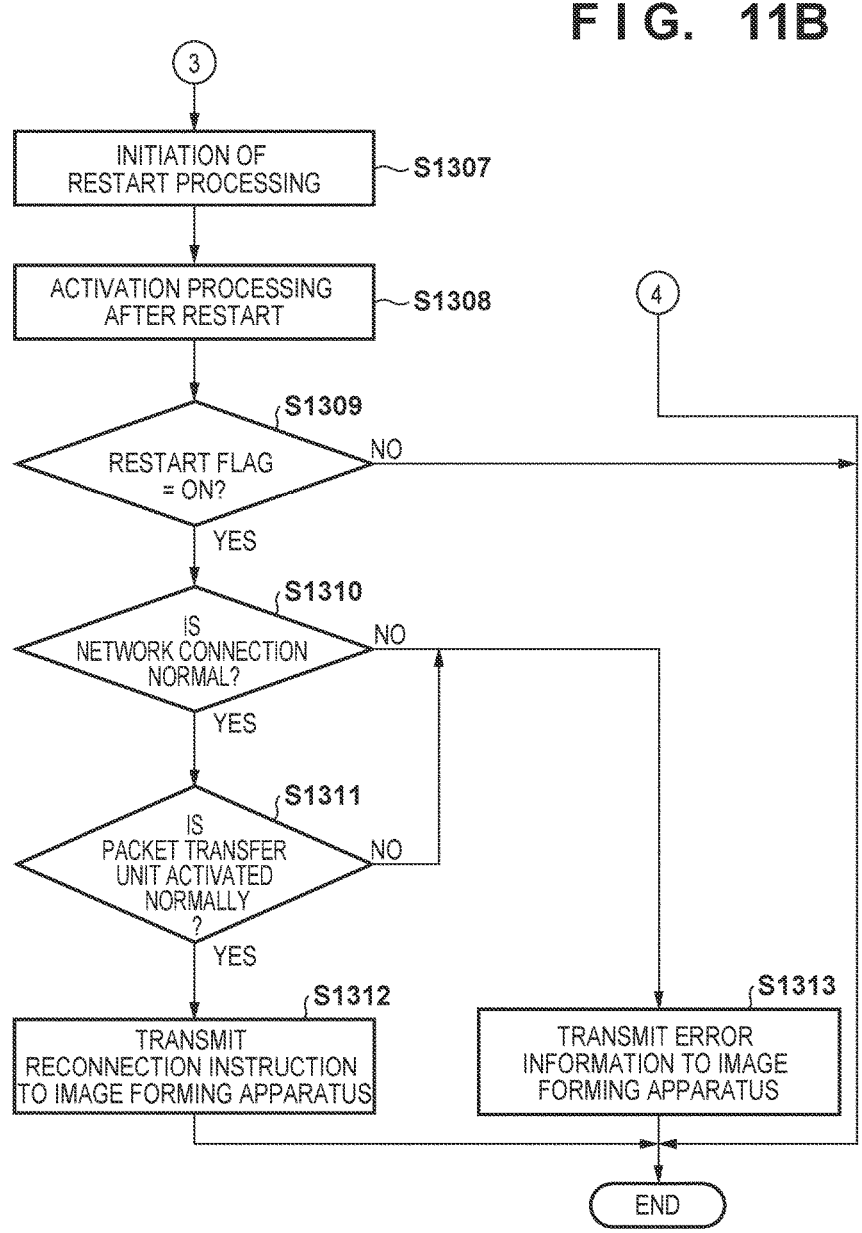

FIGS. 11A and 11B are flowcharts illustrating a procedure of processing executed by the print control apparatus 105 when the print control apparatus 105 restarts, according to the third embodiment. In FIGS. 11A and 11B, step S1801 to step S1804 are added between step S1306 and step S1307 in comparison to the flowchart of the first embodiment illustrated in FIG. 8. The processing of each step of FIGS. 11A and 11B is realized in the print control apparatus 105 by the CPU 301 reading and executing a program stored in the HDD 309.

The processing of step S1301 through step S1306 is the same as in the first embodiment. In the print control apparatus 105 of the present embodiment, the CPU 301 advances the processing to step S1801 when a setting of the reconnect flag is completed in step S1306.

In step S1801, the CPU 301 determines whether or not to restart only the print control apparatus 105 (restart together with the image forming apparatus 101), by a restart instruction made from the terminal apparatus 120 by a remote operation (remote maintenance). Here, in the operation unit 305 of the print control apparatus 105 of the present embodiment, an instruction can be made for (1) a restart of the print control apparatus 105, or (2) a restart of both the print control apparatus 105 and the image forming apparatus 101.

An operation of the screen displayed on the operation unit 305 can be performed also in the terminal apparatus 120 which is remotely operating the print control apparatus 105 by VNC communication via a VNC connection. Accordingly, (1) or (2) can be instructed by a remote operation from the terminal apparatus 120. A restart of the print control apparatus 105 can be instructed in a case where it is necessary to cause only a setting change to be reflected to the print control apparatus 105. A restart of both the print control apparatus 105 and the image forming apparatus 101 can be instructed in a case where it is necessary to cause a setting change to be reflected to both the image forming apparatus 101 and the print control apparatus 105.

The CPU 301 advances the processing from step S1801 to step S1802 in a case where a restart of both the print control apparatus 105 and the image forming apparatus 101 is instructed. In step S1802, the CPU 301 transmits a restart instruction indicating that the image forming apparatus 101 should restart to the image forming apparatus 101 and advances the processing to step S1803. This restart instruction is made by using a protocol such as SNMP. When the image forming apparatus 101 receives the restart instruction from the print control apparatus 105, restart processing of the image forming apparatus 101 is performed.

In step S1803, the CPU 301 confirms the restart of the image forming apparatus 101. Specifically, the CPU 301 confirms the restart of the image forming apparatus 101 by, for example, confirming that communication with the image forming apparatus 101 is disconnected or confirming that communication with the print control apparatus 105 after a restart of the image forming apparatus 101 is restarted. The CPU 301 advances the processing to step S1307 when it confirms the restart of the image forming apparatus 101.

Figure 13C:
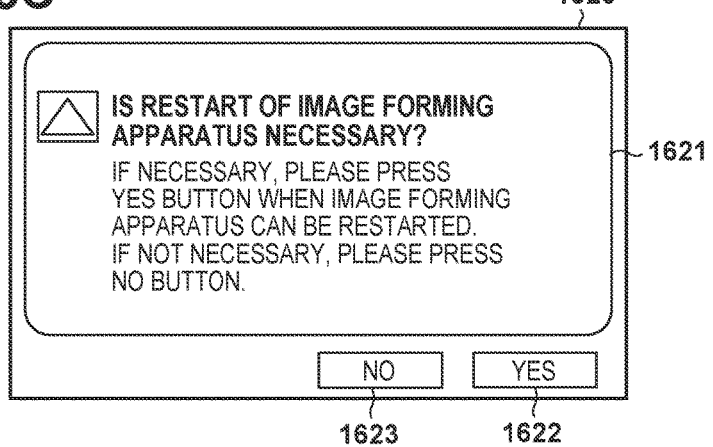

Meanwhile, the CPU 301 advances the processing from step S1801 to step S1804 in a case where a restart of only the print control apparatus 105 is instructed. In step S1804, the CPU 301 displays a screen on the operation unit 305 for confirming with a user whether or not a restart of the image forming apparatus 101 is necessary, and determines whether or not the restart of the image forming apparatus 101 is necessary in accordance with an instruction of the user via the displayed screen. A screen 1620 illustrated in FIG. 13C is an example of a screen displayed in step S1804. The screen 1620 includes a message 1621 for confirming whether or not it is necessary to restart the image forming apparatus 101. The CPU 301 advances the processing to step S1802 in a case where a button 1622 for instructing a restart is pressed in the screen 1620, and advances the processing to step S1307 in a case where for instructing not to perform a restart a button 1623 is pressed.

The processing of step S1307 through step S1313 is the same as in the first embodiment.

By virtue of the present embodiment, even when a restart of not only the print control apparatus 105 but also the image forming apparatus 101 is performed, it becomes possible to obtain the same advantage as the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-122051, filed Jun. 20, 2016, which is hereby incorporated by reference herein in its entirety.

What is claimed is:

1. An image processing system comprising a control apparatus and an image processing apparatus to which the control apparatus is connected and that accesses a network via the control apparatus, wherein remote maintenance by an information processing apparatus is performed via the network, the image processing apparatus comprising:
a first controller including a memory storing instructions and a processor which executes the instructions to:
connect to a server apparatus that relays communication between the control apparatus and the information processing apparatus and establish communication with the information processing apparatus via the server apparatus and communication with the control apparatus, so as to enable the remote maintenance of the control apparatus and the image processing apparatus to be performed by the information processing apparatus, and the control apparatus comprising:
a second controller including a memory storing instructions and a processor which executes the instructions to:

notify the image processing apparatus that the control apparatus will restart in accordance with a restart instruction from the information processing apparatus which is connected to the control apparatus via the server apparatus and which maintains the control apparatus remotely, the restart being instructed by the information processing apparatus to the control apparatus while the remote maintenance of the control apparatus is continuing; and instruct the image processing apparatus to reconnect to the server apparatus, in accordance with completion of the restart of the control apparatus.

2. The image processing system according to claim 1, wherein the image processing apparatus is instructed to reconnect to the server apparatus in a case where, after completion of the restart of the control apparatus, access to the network from the control apparatus becomes possible and a relay of communication between the network and the image processing apparatus becomes possible.

3. The image processing system according to claim 1, wherein the image processing apparatus further comprises a display unit configured to display, in accordance with reception of a notification, a screen indicating that the control apparatus is restarting; and the instructions in the first controller are further executed to:

reconnect, in accordance with reception of an instruction, to the server apparatus via the control apparatus.

4. The image processing system according to claim 3, wherein the instructions in the first controller are further executed to:

determine, in a case where it is detected that communication established with the server apparatus was disconnected, whether or not the notification has been received, wherein the display unit displays, in a case where it is determined that the notification has been received, a screen indicating that the control apparatus is restarting.

5. The image processing system according to claim 4, wherein the display unit displays, in a case where it is determined that the notification has not been received, a screen indicating that an abnormality of the network or a disconnection of communication by the server apparatus occurred.

6. The image processing system according to claim 4, wherein the instructions in the first controller are further executed to:

confirm, in a case where it is determined that the notification has not been received, with a user whether to return a setting of the control apparatus that was changed prior to the restart of the control apparatus to an original setting, wherein, in accordance with a confirmation of a user, the control apparatus is instructed to return the setting to the original setting.

7. The image processing system according to claim 3, wherein the instructions in the first controller are further executed to:

save, in accordance with reception of the notification, information necessary for reconnecting to the server apparatus, wherein the server apparatus is reconnected using the saved information.

8. The image processing system according to claim 7, wherein the information is identification information that is assigned by the server apparatus when the image processing apparatus connects to the server apparatus and that enables the information processing apparatus to identify a connection between the image processing apparatus and the server apparatus.

9. The image processing system according to claim 1, wherein the instructions in the second controller are further executed to determine whether or not it is necessary to restart the control apparatus as well as the image processing apparatus in a case where a restart is instructed from the information processing apparatus while the remote maintenance is continuing, and to cause, in a case where it is necessary to restart the image processing apparatus, the control apparatus to restart after causing the image processing apparatus to restart.

10. The image processing system according to claim 1, wherein VNC communication is established with the information processing apparatus via the server apparatus and VNC communication with the control apparatus, and the remote maintenance is performed by remotely operating the control apparatus or the image processing apparatus by the VNC communication from the information processing apparatus.

11. A control apparatus in an image processing system comprising the control apparatus and an image processing apparatus to which the control apparatus is connected and that accesses a network via the control apparatus, wherein remote maintenance by an information processing apparatus is performed via the network, the control apparatus comprising:

a controller including a memory storing instructions and a processor which executes the instructions to:

after the image processing apparatus connects to a server apparatus that relays communication between the control apparatus and the information processing apparatus and establishes communication with the information processing apparatus via the server apparatus and communication with the control apparatus, notify the image processing apparatus that the control apparatus will restart in accordance with a restart instruction from the information processing apparatus which is connected to the control apparatus via the server apparatus and which maintains the control apparatus remotely, the restart being instructed by the information processing apparatus to the control apparatus while the remote maintenance of the control apparatus is continuing; and instruct the image processing apparatus to reconnect to the server apparatus, in accordance with completion of the restart of the control apparatus.

12. An image processing apparatus in an image processing system comprising a control apparatus and the image processing apparatus to which the control apparatus is connected and that accesses a network via the control apparatus, wherein remote maintenance by an information processing apparatus is performed via the network, the image processing apparatus comprising:

a controller including a memory storing instructions and a processor which executes the instructions to:

connect to a server apparatus that relays communication between the control apparatus and the information processing apparatus and establish communication with the information processing apparatus via the server apparatus and communication with the control apparatus, so as to enable the remote maintenance of the control apparatus and the image processing apparatus to be performed by the information processing apparatus; and a display unit configured to display a screen indicating that the control apparatus is restarting in accordance with a notification that the control apparatus will restart, the notification being received from the control apparatus which was instructed to restart by the information processing apparatus which is connected to the control apparatus via the server apparatus and which maintains the control apparatus remotely, the restart is instructed by the information processing apparatus to the control apparatus while the remote maintenance of the control apparatus is continuing, wherein the instructions are further executed to reconnect to the server apparatus via the control apparatus in accordance with an instruction for reconnection to the server apparatus, the instruction being received from the control apparatus after completion of restart of the control apparatus.

13. A method of controlling an image processing system comprising a control apparatus and an image processing apparatus to which the control apparatus is connected and that accesses a network via the control apparatus, wherein remote maintenance by an information processing apparatus is performed via the network, the method comprising the steps of:

connecting the image processing apparatus to a server apparatus that relays communication between the control apparatus and the information processing apparatus, and establishing communication with the information processing apparatus via the server apparatus and communication with the control apparatus, so as to enable the remote maintenance of the control apparatus and the image processing apparatus to be performed by the information processing apparatus;

notifying, by the control apparatus, the image processing apparatus that the control apparatus will restart in accordance with a restart instruction from the information processing apparatus which is connected to the control apparatus via the server apparatus and which maintains the control apparatus remotely, the restart being instructed by the information processing apparatus to the control apparatus while the remote maintenance of the control apparatus is continuing; and instructing, by the control apparatus, the image processing apparatus to reconnect to the server apparatus, in accordance with completion of the restart of the control apparatus.

14. A method of controlling a control apparatus in an image processing system comprising the control apparatus and an image processing apparatus to which the control apparatus is connected and that accesses a network via the control apparatus, wherein remote maintenance by an information processing apparatus is performed via the network, the method comprising the steps of:

after the image processing apparatus connects to a server apparatus that relays communication between the control apparatus and the information processing apparatus and establishes communication with the information processing apparatus via the server apparatus and communication with the control apparatus, notifying the image processing apparatus that the control apparatus will restart in accordance with a restart instruction from the information processing apparatus which is connected to the control apparatus via the server apparatus and which maintains the control apparatus remotely, the restart being instructed by the information processing apparatus to the control apparatus while the remote maintenance of the control apparatus is continuing; and instructing the image processing apparatus to reconnect to the server apparatus, in accordance with completion of the restart of the control apparatus.

15. A method of controlling an image processing apparatus in an image processing system comprising a control apparatus and the image processing apparatus to which the control apparatus is connected and that accesses a network via the control apparatus, wherein remote maintenance by an information processing apparatus is performed via the network, the method comprising the steps of:

connecting to a server apparatus that relays communication between the control apparatus and the information processing apparatus and establishing communication with the information processing apparatus via the server apparatus and communication with the control apparatus, so as to enable the remote maintenance of the control apparatus and the image processing apparatus to be performed by the information processing apparatus;

displaying a screen indicating that the control apparatus is restarting in accordance with a notification that the control apparatus will restart, the notification being received from the control apparatus which was instructed to restart by the information processing apparatus which is connected to the control apparatus via the server apparatus and which maintains the control apparatus remotely, the restart is instructed by the information processing apparatus to the control apparatus while the remote maintenance of the control apparatus is continuing; and reconnecting to the server apparatus via the control apparatus in accordance with an instruction for reconnection to the server apparatus, the instruction being received from the control apparatus after completion of restart of the control apparatus.

* * * * *